US011947609B2

(12) United States Patent
Hashimoto et al.

(10) Patent No.: US 11,947,609 B2
(45) Date of Patent: *Apr. 2, 2024

(54) PORTABLE INFORMATION TERMINAL AND APPLICATION RECOMMENDING METHOD THEREOF

(71) Applicant: MAXELL, LTD., Kyoto (JP)

(72) Inventors: Yasunobu Hashimoto, Oyamazaki (JP);
Kazuhiko Yoshizawa, Oyamazaki (JP);
Nobuo Masuoka, Oyamazaki (JP);
Motoyuki Suzuki, Oyamazaki (JP);
Hiroshi Shimizu, Oyamazaki (JP);
Hideyuki Kuwajima, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,843

(22) Filed: Oct. 31, 2022

(65) Prior Publication Data

US 2023/0051401 A1 Feb. 16, 2023

Related U.S. Application Data

(63) Continuation of application No. 16/933,711, filed on Jul. 20, 2020, now Pat. No. 11,514,120, which is a
(Continued)

(51) Int. Cl.
*G06F 16/9535* (2019.01)
*G06F 16/248* (2019.01)
*G06F 3/04817* (2022.01)

(52) U.S. Cl.
CPC ........ *G06F 16/9535* (2019.01); *G06F 16/248* (2019.01); *G06F 3/04817* (2013.01)

(58) Field of Classification Search
CPC .......................... G06F 16/9535; G06F 16/248
See application file for complete search history.

(56) References Cited

U.S. PATENT DOCUMENTS 8,255,280 B1 * 8/2012 Kay .......................... G06F 9/54
705/26.1
8,935,393 B1 1/2015 Jackson et al.
(Continued)

FOREIGN PATENT DOCUMENTS

JP 2003-114903 A 4/2003
JP 2007-328414 A 12/2007
(Continued)

OTHER PUBLICATIONS

U.S. PTO Non-Final Office Action issued in related parent U.S. Appl. No. 15/737,161, dated Dec. 13, 2019.
(Continued)

*Primary Examiner* — Christopher J Raab
(74) *Attorney, Agent, or Firm* — Rimon P.C.

(57) ABSTRACT

The purpose of the present invention is to provide a suitable user-friendliness to a user regarding a recommendation of application software on a portable information terminal. In order to accomplish the purpose, this portable information terminal is configured to set an application as a recommendation candidate when the status of the portable information terminal matches a condition corresponding to the application, and recommend the application when the application further matches a pre-set recommendation permitting condition. Hence, the portable information terminal and the application recommending method thereof capable of providing a preferable user-friendliness to the user can be provided.

16 Claims, 22 Drawing Sheets

Related U.S. Application Data continuation of application No. 15/737,161, filed as application No. PCT/JP2015/067790 on Jun. 19, 2015, now Pat. No. 1,074,832.

(56) References Cited

U.S. PATENT DOCUMENTS

| | | |
|---|---|---|
| 2003/0088871 A1 | 5/2003 | Kimura |
| 2008/0244656 A1 | 10/2008 | Sumiyoshi et al. |
| 2010/0146442 A1 | 6/2010 | Nagasaka et al. |
| 2011/0307354 A1 | 12/2011 | Erman et al. |
| 2012/0096435 A1 | 4/2012 | Manolescu et al. |
| 2012/0136503 A1 | 5/2012 | Schunder |
| 2013/0173637 A1* | 7/2013 | Kim ............ G06F 16/27 707/736 |
| 2013/0325856 A1* | 12/2013 | Soto Matamala ... G06F 16/248 707/724 |
| 2013/0339345 A1 | 12/2013 | Matamala et al. |
| 2014/0365944 A1 | 12/2014 | Moore et al. |
| 2015/0346961 A1 | 12/2015 | Cui et al. |
| 2016/0065437 A1 | 3/2016 | Xu |
| 2016/0066120 A1* | 3/2016 | Lee .............. G06Q 30/0255 455/418 |
| 2016/0170575 A1* | 6/2016 | Ye ............... G06F 16/24565 715/739 |

FOREIGN PATENT DOCUMENTS

| | | |
|---|---|---|
| JP | 2008-187576 A | 8/2008 |
| JP | 2010-508592 A | 3/2010 |
| JP | 2014-002562 A | 1/2014 |
| JP | 2015-504212 A | 2/2015 |
| JP | 2015-111813 A | 6/2015 |
| WO | 2008/052205 A2 | 5/2008 |

OTHER PUBLICATIONS

U.S. PTO Notice of Allowance issued in related parent U.S. Appl. No. 15/737,161, dated Apr. 7, 2020.
U.S. PTO Non-Final Office Action issued in related parent U.S. Appl. No. 16/933,711, dated Jan. 7, 2022.
U.S. PTO Notice of Allowance issued in related parent U.S. Appl. No. 16/933,711, dated Jul. 21, 2022.
International Search Report issued in corresponding International Application No. PCT/JP2015/067790, dated Aug. 11, 2015.

* cited by examiner

F I G. 1
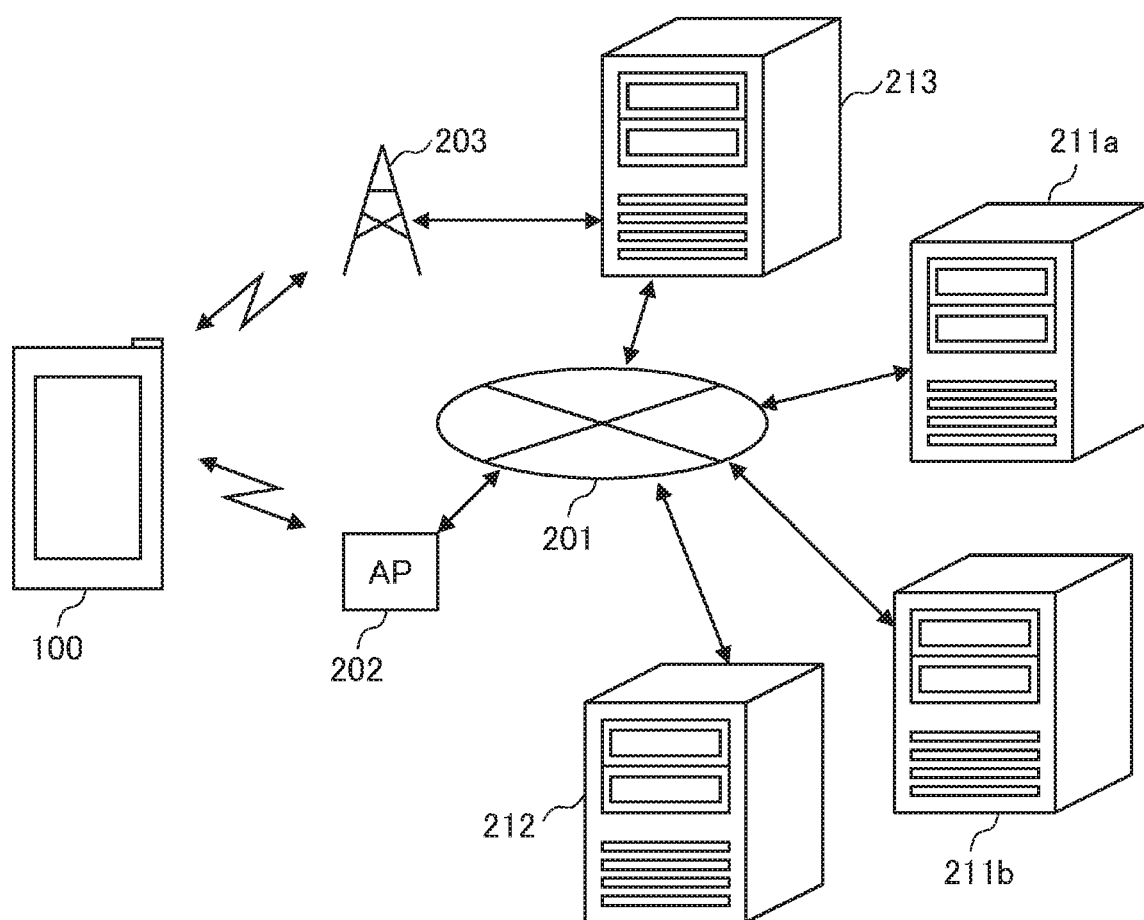

F I G. 9 A
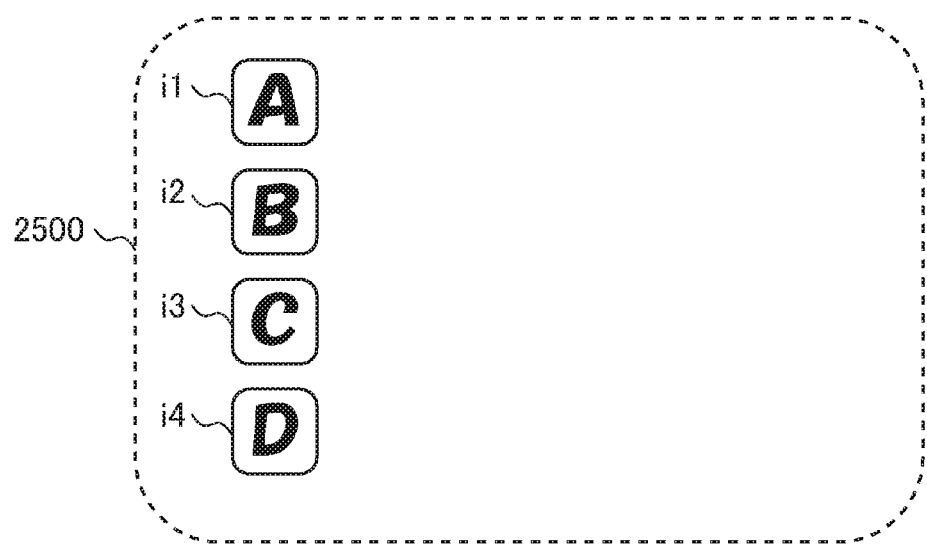
F I G. 9 B
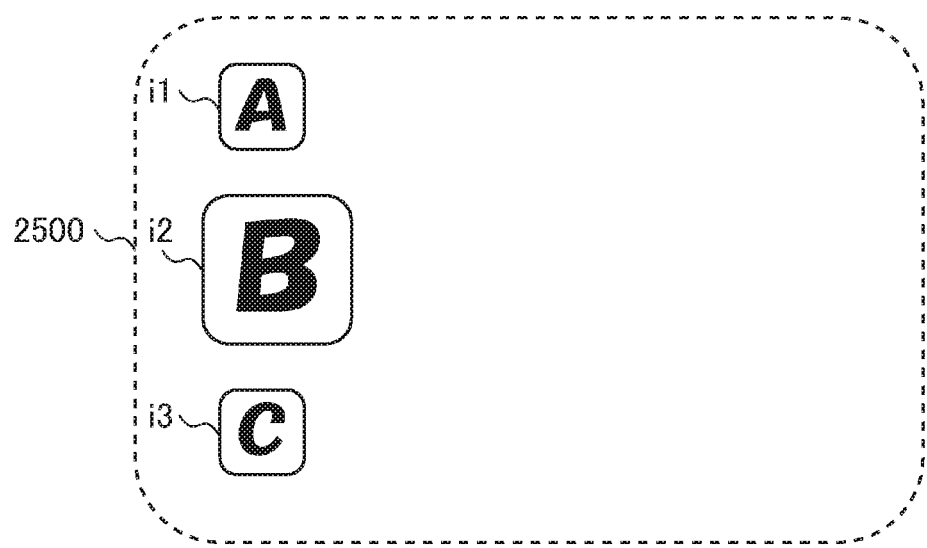

PORTABLE INFORMATION TERMINAL AND APPLICATION RECOMMENDING METHOD THEREOF

CROSS REFERENCE

This is a Continuation of U.S. patent Ser. No. 16/933,711, filed on Jul. 20, 2020, which is a Continuation of U.S. patent application Ser. No. 15/737,161, filed on Dec. 15, 2017, now U.S. Pat. No. 10,747,832, issued on Aug. 18, 2020, which is the U.S. National Phase under 35 U.S.C. § 371 of International Application No. PCT/JP2015/067790 filed on Jun. 19, 2015, the entire contents of which are hereby incorporated by reference.

TECHNICAL FIELD

The present invention relates to an application information recommending technique and a screen display control technique of a portable information terminal.

BACKGROUND ART

Performance improvement and multi-functionalization of portable information terminals such as mobile phones, smart phones, and tablet terminals are remarkable. A lot of useful application software (hereinafter abbreviated as an "application") has been provided, and it is general that various applications are stored in an internal storage of a portable information terminal, and an application is differently used according to a situation.

However, there is a problem in that since it is difficult for a user to always recognize a type of application to be used depending on each situation, the user loses opportunities to use appropriate applications. As a technique for solving this problem, for example, a technique disclosed in US 2013/0,339,345 A (Patent Document 1) has been proposed. A technique of recommending an application suitable for a position in accordance with a position of a portable information terminal is disclosed in Patent Document 1.

CITATION LIST

Patent Document

Patent Document 1: US 2013/0,339,345 A

SUMMARY OF THE INVENTION

Problems to be Solved by the Invention

According to the technique disclosed in Patent Document 1, it is stated that it is possible to use an application suitable for the position of the portable information terminal among many applications. However, since the application recommendation according to Patent Document 1 is performed according to a condition (position) in which a situation of the portable information terminal is satisfied, the number of recommendation applications may be too large in some situations, and since a display method when there are a plurality of recommendation applications is not considered, there may arise a situation in which there is a lack of convenience. For example, in a case in which a recommendation application is an application of introducing services of stores, the application recommendation may be congested in a densely populated area such as a downtown area. In a case in which an application is recommended on the basis of icon display, there arises a problem in that an icon is unable to be displayed depending on a size of a display region.

In the technique disclosed in Patent Document 1, a method of narrowing down the recommendation applications from ranking data of applications at the position is described, but there is a problem in that a preference of the user is not necessarily reflected in this method.

The present invention was made in light of the foregoing, and it is an object of the present invention to provide a portable information terminal and an application recommending method thereof which are capable of giving more suitable usability to the user.

Solutions to Problems

In order to solve the above problem, for example, a configuration set forth in claims is employed. The present invention includes a plurality of means for solving the above problem, and according to one aspect of the present invention, provided is a portable information terminal that presents, when a status of the portable information terminal satisfies a condition corresponding to an application, the application as a recommendation candidate and recommends the application when the application further satisfies a preset recommendation permitting condition.

Effects of the Invention

According to the present invention, it is possible to provide a portable information terminal and an application recommending method thereof which are capable of giving more suitable usability to the user.

BRIEF DESCRIPTION OF THE DRAWINGS

FIG. 1 is a configuration diagram of a communication system including a portable information terminal according to a first embodiment.

FIG. 9A is a display example of the glasses type display terminal of FIG. 7B.

FIG. 9B is another display example of the glasses type display terminal of FIG. 7B.

MODE FOR CARRYING OUT THE INVENTION

Figure 2:
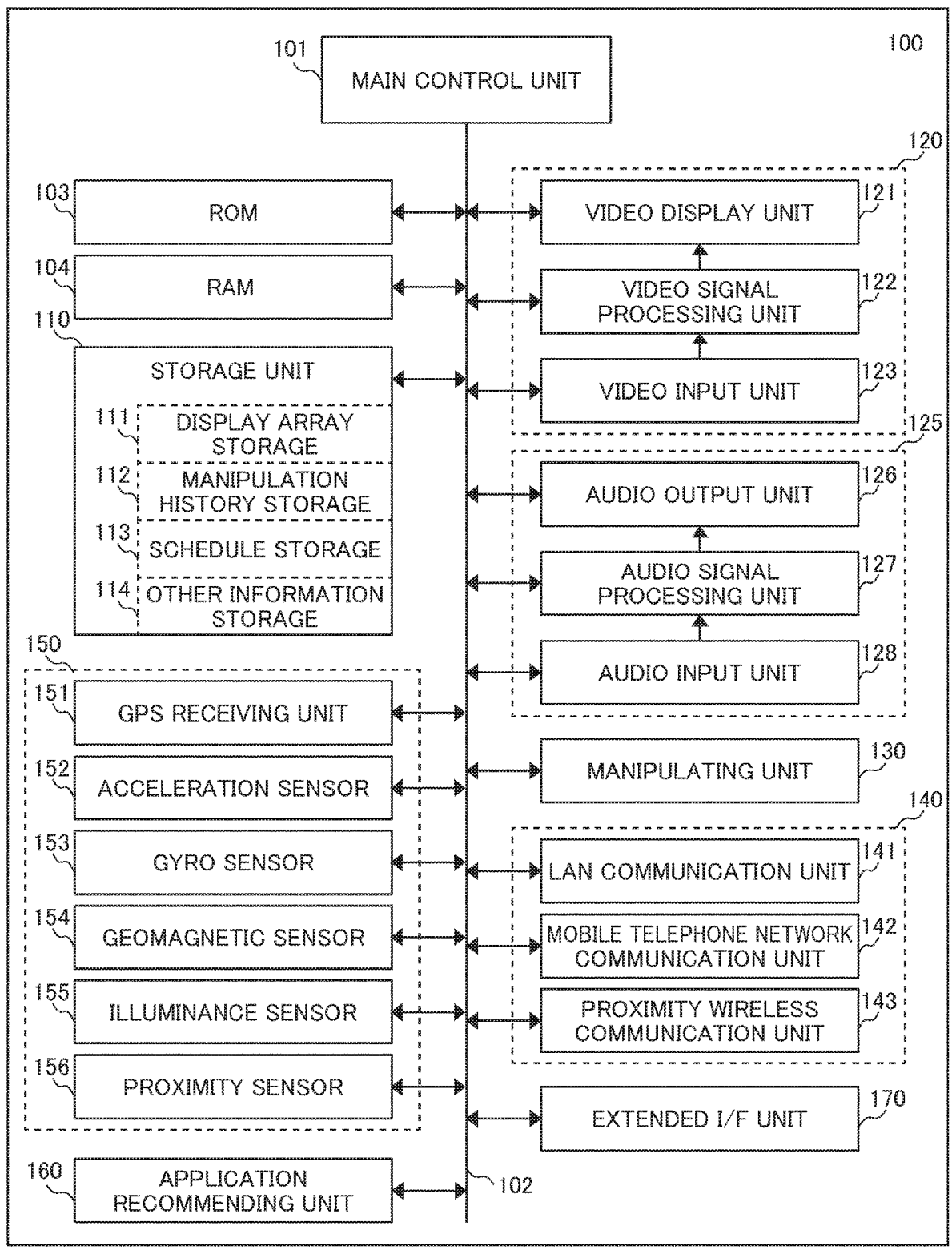
FIG. 2 is a block diagram of the portable information terminal according to the first embodiment.

Hereinafter, embodiments of the present invention will be described with reference to the appended drawings.

First Embodiment

FIG. 1 is a block diagram of a communication system including a portable information terminal 100 according to the present embodiment. Referring to FIG. 1, the communication system includes the portable information terminal 100, a wide area public network 201 such as the Internet, a wireless communication access point 202, a base station 203 of a mobile telephone communication network, an application server 211a, an application recommendation server 211b, an Internet e-mail server 212, and a mobile telephone communication server 213. The application server 211a may double as the application recommendation server 211b.

The portable information terminal 100 may be a mobile phone, a smart phone, a tablet terminal, or the like or may be a personal digital assistants (PDA) or a laptop personal computer (PC). Further, it may be a music player, a digital camera, a portable game machine, or the like having a communication function or other portable digital equipment.

FIG. 2 is a block diagram of the portable information terminal 100 according to the present embodiment. Referring to FIG. 2, the portable information terminal 100 includes a main control unit 101, a system bus 102, a read only memory (ROM) 103, a random access memory (RAM) 104, a storage unit 110, a video processing unit 120, an audio processing unit 125, a manipulating unit 130, a communication processing unit 140, a sensor unit 150, an application recommending unit 160, and an extended interface unit 170. The main control unit 101 is a microprocessor unit that controls the entire portable information terminal 100 in accordance with a predetermined program. The system bus 102 is a data communication path in which transmission and reception of data are performed between the main control unit 101 and the respective units in the portable information terminal 100. The ROM 103 is a memory that stores a basic operation program of the portable information terminal 100, such as an operating system and predetermined application software, and a rewritable ROM such as an electrically erasable programmable ROM (EEPROM) or a flash ROM is used. By updating the program stored in the ROM 103, it is possible to upgrade the version and the function of the basic operation program. The ROM 103 may not be as an independent configuration illustrated in FIG. 2, and a part of a storage region in the storage unit 110 may be used. The RAM 104 functions as a work area when the basic operation program or various kinds of application software is executed. Further, the ROM 103 and the RAM 104 may be integrated with the main control unit 101.

For example, the storage unit 110 is used for storing each operation setting value of the portable information terminal 100, information of the user, and various kinds of application software to be operated. The storage unit 110 includes a display array storage region 111 that stores an arrangement state of icons associated with applications (or data generated by applications) on a display screen, other information related to a screen layout, and the like, a manipulation history storage region 112 that stores a manipulation history or the like of the portable information terminal 100 of the user of the portable information terminal 100, a schedule storage region 113 that stores an schedule or the like of the user input by the user of the portable information terminal 100, and other information storage region 114 that stores other general information. A position of each storage region in the storage unit 110 need not be necessarily fixed. Further, it is necessary for the storage unit 110 to hold stored information even when the portable information terminal 100 is not supplied with electric power. Therefore, for example, a device such as a flash ROM, a solid state drive (SSD), and a hard disc drive (HDD) is used.

All or some of the functions of the ROM 103 may be replaced with a partial area of the other information storage region 114. Further, the function of the portable information terminal 100 can be expanded by downloading new application software from the application server 211a via an Internet 201 and the wireless communication access point 202 or the base station 203 of the mobile telephone communication network. At this time, the downloaded new application software may be stored in the other information storage region 114. As the new application software stored in the other information storage region 114 is developed onto the RAM 104 and executed, the portable information terminal 100 can implement various kinds of new functions.

The video processing unit 120 includes a video display unit 121, a video signal processing unit 122, and a video input unit 123. The video display unit 121 is, for example, a display device such as a liquid crystal panel, and provides a video signal processed by the video signal processing unit 122 to the user of the portable information terminal 100. The video signal processing unit 122 includes a video RAM (not illustrated) and implements screen display by inputting video data to the video RAM. Further, the video signal processing unit 122 has a function of performing format conversion, superimposition processing of menus or other on screen display (OSD) signals, or the like if necessary. The video input unit 123 is a camera that inputs image data of a surrounding area or an object by converting light input from a lens into an electric signal.

The audio processing unit 125 includes an audio output unit 126, an audio signal processing unit 127, and an audio input unit 128. The audio output unit 126 is a speaker and provides an audio signal processed by the audio signal processing unit 127 to the user of the portable information terminal 100. The audio input unit 128 is a microphone, and converts a voice of the user or the like into sound data and inputs it.

The manipulating unit 130 is an instruction input unit that inputs a manipulation instruction to the portable information terminal 100, and in the present embodiment, it is assumed that the manipulating unit 130 is configured with a touch panel arranged superimposed on the video display unit 121 and manipulation keys in which button switches are arranged. The manipulating unit 130 may be configured with either of the touch panel or the manipulation keys. Further, the portable information terminal 100 may be manipulated using a keyboard or the like connected to the extended interface unit 170 to be described later. Also, the touch panel function may be provided by the video display unit 121.

The communication processing unit 140 includes a LAN communication unit 141, a mobile telephone network communication unit 142, and a proximity wireless communication unit 143. The LAN communication unit 141 is connected with the wireless communication access point 202 of the Internet 201 through wireless communication and performs transmission and reception of data. The mobile telephone network communication unit 142 performs telephone communication (call) and transmission and reception of data through wireless communication with the base station 203 of the mobile telephone communication network. The proximity wireless communication unit 143 performs wireless communication when approaching a corresponding reader/writer. Each of the LAN communication unit 141, the mobile telephone network communication unit 142, and the proximity wireless communication unit 143 includes an encoding circuit, a decoding circuit, an antenna, and the like.

The sensor unit 150 is a group of sensors for detecting the state of the portable information terminal 100, and in the present embodiment, the sensor unit 150 includes a global positioning system (GPS) receiving unit 151, an acceleration sensor 152, a gyro sensor 153, a geomagnetic sensor 154, an illuminance sensor 155, and a proximity sensor 156. With the sensor groups, it is possible to detect a position, a motion, an inclination, a direction, and peripheral brightness of the portable information terminal 100, a proximity state of a surrounding object, and the like. Other sensors may be further installed.

The application recommending unit 160 performs an application recommendation process of infers and recommends an application that the user of the portable information terminal 100 desires to use on the basis of information related to a current location of the portable information terminal 100, information related to a current time, or other information. The application recommendation process will be described later in detail. The application recommending unit 160 may not be an independent configuration as illustrated in FIG. 2, and the same function may be implemented by executing predetermined application software through the main control unit 101 using the RAM 104 as a work area.

The extended interface unit 170 is an interface group for extending the function of the portable information terminal 100, and in the present embodiment, the extended interface unit 170 includes a video/audio interface, a universal serial bus (USB) interface, a memory interface, and the like. The video/audio interface receives a video signal/audio signal from an external video/audio output device and outputs a video signal/audio signal to an external video/audio input device. The USB interface performs, for example, a connection of the keyboard or other USB devices. The memory interface connects a memory card and performs transmission and reception of data.

The configuration example of the portable information terminal 100 illustrated in FIG. 2 includes several components that are not essential in the present embodiment such as the proximity wireless communication unit 143, the illuminance sensor 155, the proximity sensor 156, and the like, but even when the components are not installed, the effects of the present embodiment are not damaged. Further, a component not illustrated in the drawings such as a digital television broadcast receiving function or an electronic money payment function may be further added.

Next, the application recommendation process performed by the portable information terminal 100 of the present embodiment will be described with reference to the flowchart of FIG. 3.

First, a condition of an application permitted to be recommended is set in the portable information terminal 100 of the present embodiment in advance (S11). For example, it is a condition setting in which applications are classified into categories, and recommendation is permitted only for a designated category. It may be a condition setting in a negative form in which the recommendation is prohibited. Next, status information of the portable information terminal 100 is acquired (S12). Specifically, it is position information or the like. Next, applications in which a condition set for each application, that is, a condition corresponding to each application coincides with the status of the portable information terminal 100 are selected as recommendation application candidates (S13). For example, it is set as the application recommendation condition whether or not the portable information terminal 100 is located near a specific point. Finally, an application satisfying the recommendation permitting condition set in S11 among the application candidates is actually recommended in the portable information terminal 100 (S14). A specific recommendation method is application icon display, but other forms may be used. It will be appreciated that the condition of the application permitted to be recommended pre-set in the portable information terminal 100 in advance in S11 can be changed on the portable information terminal 100 if necessary.

The application recommendation process performed by the portable information terminal 100 of the present embodiment will be described in further detail with reference to the flowchart of FIG. 4.

Figure 5:
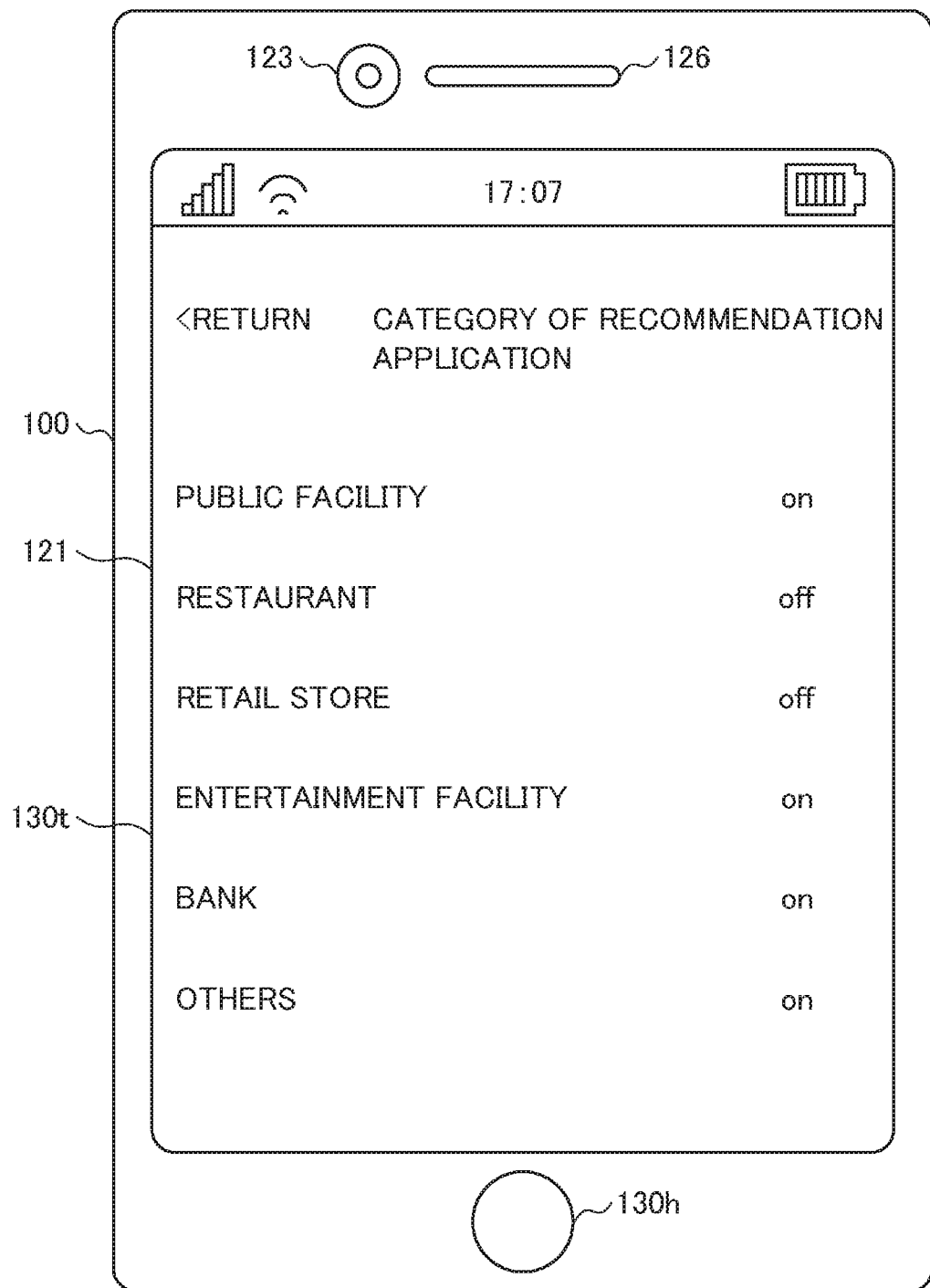
FIG. 5 illustrates a screen display example for describing a recommendation permitting condition setting for a recommendation application according to the first embodiment.

First, the recommendation permitting condition for the application permitted to be recommended is set in the portable information terminal 100 of the present embodiment in advance (S100). An example of the application recommendation permitting condition setting is illustrated in FIG. 5. Here, categories are classified in accordance with a type of facility associated with an application, and permission/non-permission of recommendation is set for each category. "On" indicates the permission, and "off" indicates the non-permission, and for example, in the case of "on," an icon of a recommendation application is displayed, and in the case of "off," the icon of the recommendation application is not displayed. Further, switching between "on" and "off" is performed by tapping an on/off character part. The recommendation permitting condition setting is not limited to the category classification, but any other setting may be used. For example, in the case of an application to be downloaded from a server, the condition setting may be performed on the basis of a usage fee range. Alternatively, the condition setting may be performed in a predetermined time zone which is an application execution time.

Returning to FIG. 4, after the above condition setting, the application is actually recommended when the status of the portable information terminal 100 satisfies a specific condition, that is, a condition corresponding to each application. Here, an example regarding the position information and the time information is illustrated. First, the GPS receiving unit 151 receives radio waves from GPS satellites and acquires the position information (S101). Then, the main control unit 101 acquires current location information with reference to map data using the position information acquired in the process of S101 (S102). Further, the main control unit 101 acquires current time information (S103).

The map data may be previously stored in the other information storage region 114 or the like by the portable information terminal 100 or may be stored in a map data server (not illustrated). If the map data is stored in the map data server, it is preferable to transmit the position information acquired by the main control unit 101 in the process of S101 in the process of S102 to the map data server via the LAN communication unit 141 (or the mobile telephone network communication unit 142) and the Internet 201 and then acquire the current location information.

Further, the process of acquiring the current time information in S103 is preferably performed with reference to a clock function provided by the main control unit 101. Alternatively, it is preferable to perform communication with a time server (not illustrated) via the LAN communication unit 141 (or the mobile telephone network communication unit 142) and the Internet 201.

After the current location information and the current time information are acquired in the process of S102 and S103, the main control unit 101 gives notification indicating the information to the application recommendation server 211b (S104). In a case in which the current location is determined through the application recommendation server 211b, a notification indicating the position information instead of the current location information may be given. Then, the application recommendation server 211b performs determination on the basis of the status information of the portable information terminal 100, selects recommendation applications considered to be suitable for the user, and gives a notification indicating information of the applications to the portable information terminal 100 as a recommendation candidate (S105). Finally, after the information of the recommendation applications is acquired from the application recommendation server 211b, the application recommending unit 160 recommends only an application permitted to be recommended with reference to the recommendation permitting condition previously set by the user (S106). Here, as described above, the recommendation permitting condition may be set for each category, may be set in accordance with a predetermined time zone, or may be set in accordance with a predetermined price range.

Further, a series of application recommendation processes described above may be performed with reference to only the current location information acquired in S102 or may be performed with reference to only the current time information acquired in S103. Although not illustrated in the flowchart of FIG. 4, in addition to the current location information and the current time information, a manipulation history or the like of the portable information terminal 100 of the user of the portable information terminal 100 stored in the manipulation history storage region 112 may be referred to, a schedule or the like which is input by the user of the portable information terminal 100 and stored in the schedule storage region 113 may be referred to. An output of each sensor group installed in the portable information terminal 100 may be further referred to. Furthermore, the application recommendation process may be performed when the position of the portable information terminal 100 is changed by a predetermined distance or more or may be made each time a predetermined time elapses.

Next, a series of application recommendation processes will be described using specific examples. For example, in a case in which the current location information acquired in S102 substantially coincides with a location of a certain station of a certain railroad company, an application of displaying a timetable of the certain station, a transfer guidance application, an application of display a map of a rail line network including the railroad company, and the like are preferably presented as the recommendation candidates. In a case in which the current location information obtained in S102 substantially coincides with a location of a certain theme park, an application of displaying a park map of the certain theme park, an application of guiding a waiting time or a congestion state of each attraction of the certain theme park, and the like are preferably presented as the recommendation candidates. Further, when the current location information obtained in S102 substantially coincides with a location of a company which the user of the portable information terminal 100 registers in advance, and the user of the portable information terminal 100 is working for, applications used for business such as a scheduler or spreadsheet application and a translation application, and the like are preferably presented as the recommendation candidates. Further, in a case in which the portable information terminal 100 is determined to be in a vehicle traveling on an express highway on the basis of the current location information acquired in S102, an application of displaying traffic information, an application of displaying a route map of the express highway, and the like are preferably presented as the recommendation candidates.

Further, for example, in a case in which the current location information acquired in S102 substantially coincides with the location of the certain station of the certain railroad company, the recommendation candidate is further presented in accordance with the current time information acquired in S103, and for example, when the current time information indicates a general meal time zone, a gourmet-related application of introducing restaurants around the certain station and the like are preferably presented as the recommendation candidates, and when the current time information indicates other time zones, an application of displaying the timetable and the like are preferably presented as the recommendation candidates. Further, in a case in which the current location information acquired in S102 substantially coincides with the location of the certain theme park, the recommendation candidate is further presented in accordance with the current time information acquired in S103, and for example, when the current time information indicates a time near a closing time of the certain theme part, an application of displaying traffic jam information of the express highway, an application of displaying a timetable of a station closest to the certain theme park, and the like are preferably presented as the recommendation candidates, and when the current time information indicates other time zones, an application of displaying the park map and the like are preferably presented as the recommendation candidates.

In a case in which the current location information obtained in S102 substantially coincides with the location of the company which the user of the portable information terminal 100 is working for, the recommendation candidate is further presented in accordance with the current time information acquired in S103, and for example, when the current time information indicates an average clock-out time zone of the user of the portable information terminal 100, an application of displaying the timetable of a station closest to the company and the like are preferably presented as the recommendation candidates, and when the current time information indicates other time zones, applications used for business are preferably presented as the recommendation candidates. Further, information of the average clock-out time zone of the user of the portable information terminal 100 is preferably obtained, for example, such that the position information of the portable information terminal 100 or the history of the current location information is stored in the manipulation history storage region 112, an average time at which the portable information terminal 100 moves from the location of the company to another place from the history of the current location information, and the calculated time is dealt as the average clock-out time of the user of the portable information terminal 100. The user of the portable information terminal 100 may register the clock-out time in the schedule storage region 113 or the like in advance.

In a case in which the portable information terminal 100 is determined to be positioned on the express highway from the current location information acquired in S102, when the portable information terminal 100 is determined to be moving on the express highway at a speed equal to or higher than a predetermined speed with reference to an output of the acceleration sensor 152 or the like, an application of displaying an expected arrival time to the destination registered in advance by the user of the portable information terminal 100, an application of displaying sightseeing guidance of the destination, and the like may be presented as the recommendation candidates, and when the portable information terminal 100 is determined to be moving on the express highway at a speed less than a predetermined speed, an application of displaying accident information, traffic jam information, or the like may be presented as the recommendation candidate.

Further, for example, an application of displaying the route map to the destination of the user of the portable information terminal 100 and the like may be presented as the recommendation candidate with reference to the schedule which is input by the user of the portable information terminal 100 and stored in the schedule storage region 113. Further, an application of displaying the guide map of the destination may be presented as the recommendation candidate.

The number of applications to be presented as the recommendation candidate through the application recommendation process is not limited to one and may be two or more. Conversely, in a case in which the application server 211b determines that there is no application considered to be desired to be used by the user of the portable information terminal 100 even with reference to the current location information, the current time information, other information, or the like, a notification indicating an application recommendation candidate may not be given.

In a case in which the application determined to be desired to be used by the user of the portable information terminal 100 in the process of S104 is already stored in the storage unit 110 or the like of the portable information terminal 100, the application is preferably recommended as the application considered to be desired to be used by the user of the portable information terminal 100 without change. In a case in which the application determined to be desired to be used by the user of the portable information terminal 100 is not stored in the storage unit 110 or the like of the portable information terminal 100 but stored in the application server 211a or the like, for example, installation software of the application may be presented as the recommendation candidate of the application desired to be used by the user of the portable information terminal 100. Alternatively, browser software linked to a web page introducing the application may be presented as the recommendation candidate of the application desired to be used by the user of the portable information terminal 100.

Figure 6:
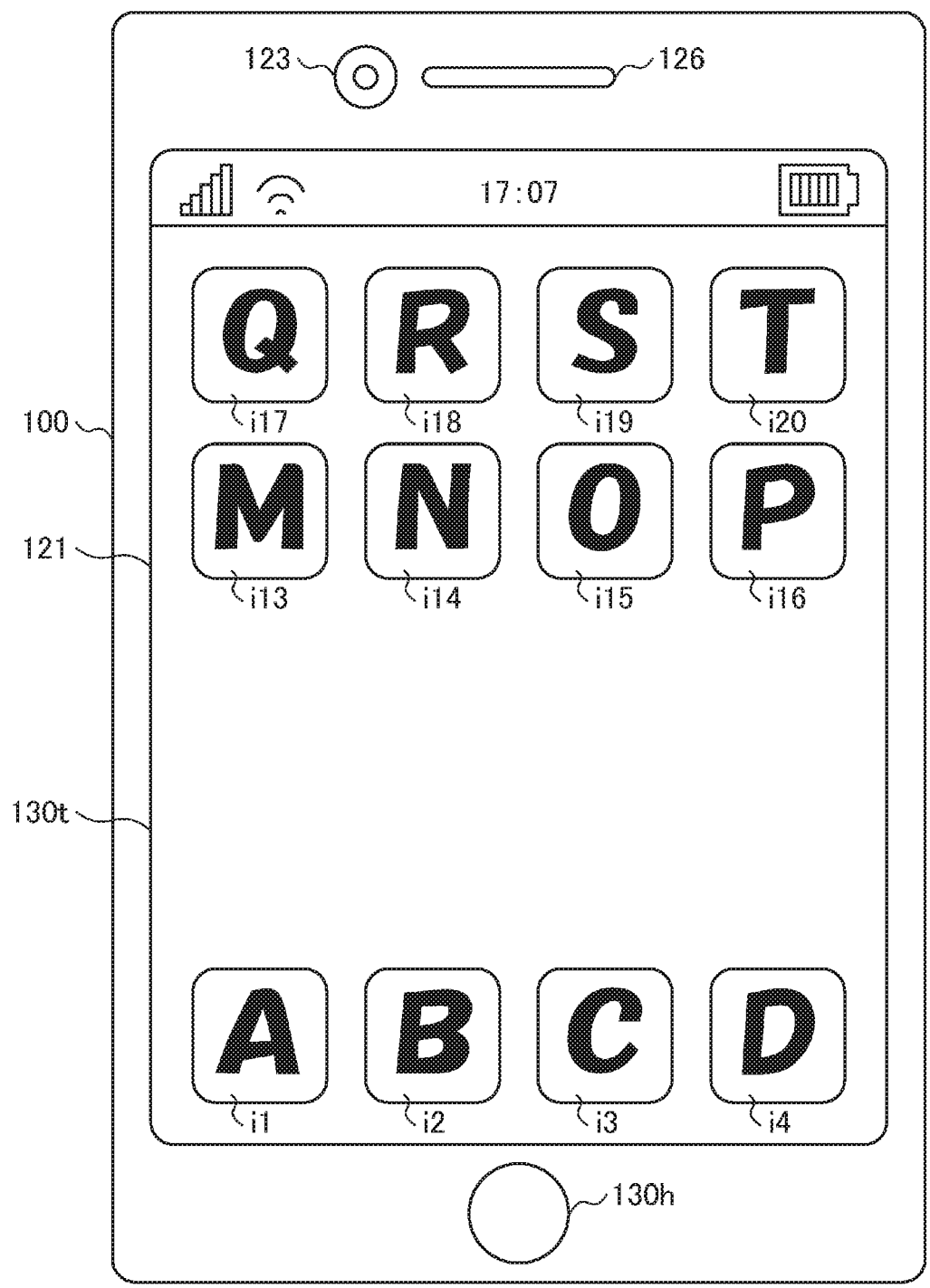
FIG. 6 illustrates a screen display example for describing display of a recommendation application according to the first embodiment.

FIG. 6 is a screen display example illustrating an example of a basic screen layout in a standby state of the portable information terminal 100 according to the present embodiment. In FIG. 6, components having the same reference numerals as those in FIG. 5 are assumed to have the same configuration/operation as those in FIG. 5, and description thereof is omitted. A touch panel 130t and a home key 130h are constituent elements of the manipulating unit 130, and, particularly, the home key 130h has a function of terminate an application being executed and displaying the basic screen when the home key 130h is pushed while various kinds of applications are being executed.

When the normal operation is performed, in the standby state, video data of the basic screen layout of the portable information terminal 100 stored in the display array storage region 111 is input to the RAM 104. Meanwhile, after the application recommendation process of the present embodiment is performed, the main control unit 101 inputs video data of the screen layout in which the user of the portable information terminal 100 selects the application recommended through the application recommendation process of S104 to the RAM 104 through a screen display control process according to a result of the application recommendation process. Through the process, the display screen for facilitating the selection of the recommended application is presented to the user of the portable information terminal 100. Further, when various kinds of applications stored in the portable information terminal 100 are selected and executed, video data of an execution screen of the application is input to the RAM 104.

Icons i13 to i20 illustrated in FIG. 6 are icons associated with various kinds of applications stored in the portable information terminal 100 (or data generated by the respective applications) and displayed within a display area of the video display unit 121. It is possible to activate the application associated with icon (or the application used to generate data associated with the icon) by selecting the icon. In the present embodiment, the selection of the icon is performed by performing a manipulation such as tapping or double tapping on a part of the touch panel 130t on which the icon is displayed.

On the other hand, icons i1 to i4 displayed at the bottom of the video display unit 121 are icons of recommended applications. In other words, the icons i1 to i4 are icons of the recommendation applications presented by executing the application recommendation when there are applications to be recommended to the user of the portable information terminal 100 as a result of performing the application recommendation process in S106. The icons i1 to i4 are not displayed on the screen before the recommendation is executed. If the applications are already downloaded to the portable information terminal 100, when an icon is selected, a corresponding application is activated. If the recommended application is not downloaded to the portable information terminal 100, when an icon is selected, a connection with the application server 211a from which a corresponding application can be downloaded is established so that the application can be downloaded. If the user desires to use the application, it is preferable to download and activate the application.

The icon of the recommended application may be displayed until the condition related to the status of the portable information terminal 100 does not satisfy the recommendation condition or may be displayed for a certain period of time. Alternatively, it may be erased in accordance with an operation such as a flick operation performed by the user.

Further, information for selecting the recommendation candidate of the application may be overall information useful for estimating an application desired by the user such as a season, a weather at the position of the portable information terminal 100, or the like in addition to the position of the portable information terminal 100 and the time.

A timing at which the main control unit 101 notifies the application recommendation server 211b of information to start the application recommendation process may be, for example, a timing at which the portable information terminal 100 transitions from a power-off state to a power-on state, a timing at which a sleep state is canceled, a timing at which the home key 130h or a predetermined arbitrary operation key is pushed, or the like. The timing may be a timing at which an icon prepared for executing the application recommendation process on the video display unit 121 is selected and executed. The timing may be, for example, other timings following a predetermined schedule set in advance.

Alternatively, a list of recommendation candidates and a list of recommendation conditions may be acquired from the application recommendation server 211b, and the application recommending unit 160 may perform up to the process of selecting the recommendation candidate.

Figure 3:
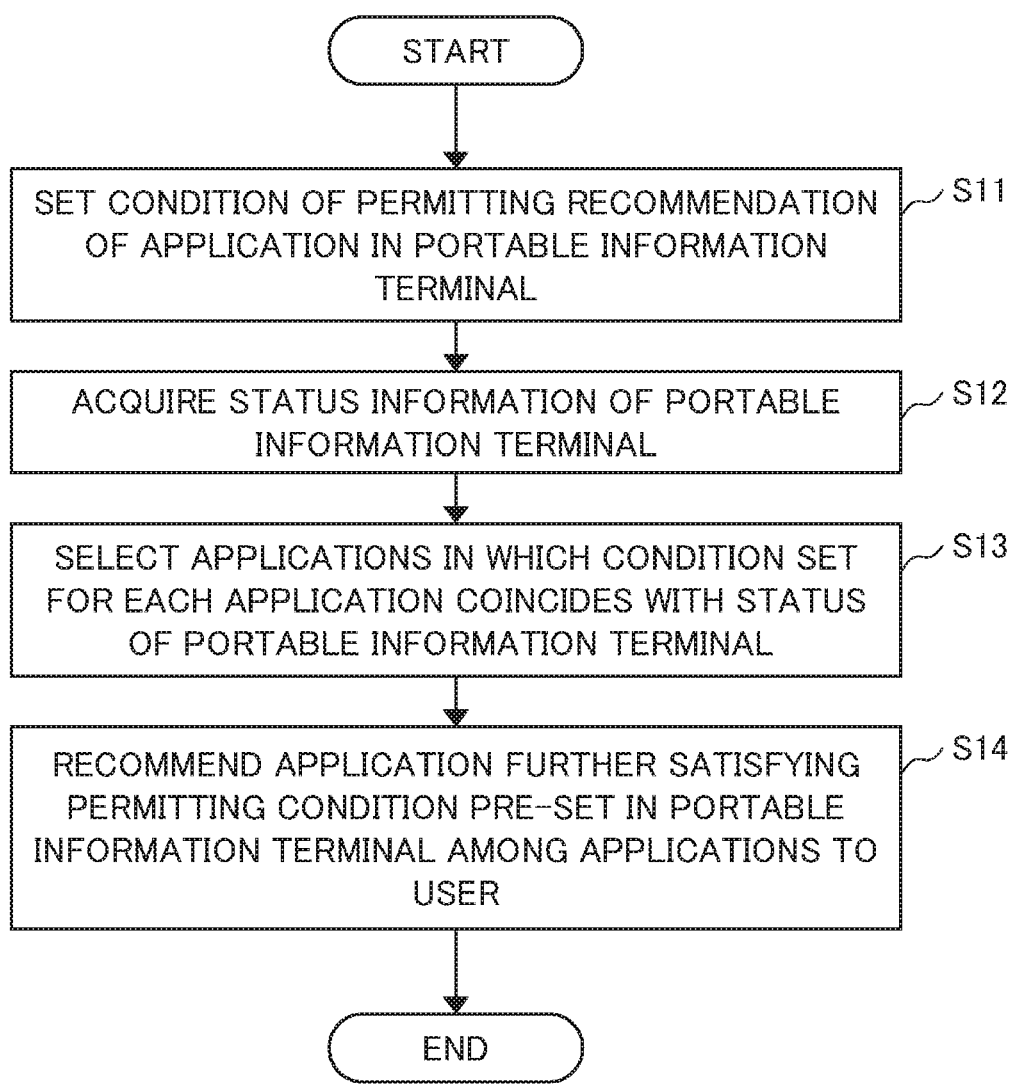
FIG. 3 is a flowchart for describing an application recommendation process according to the first embodiment.
Figure 4:
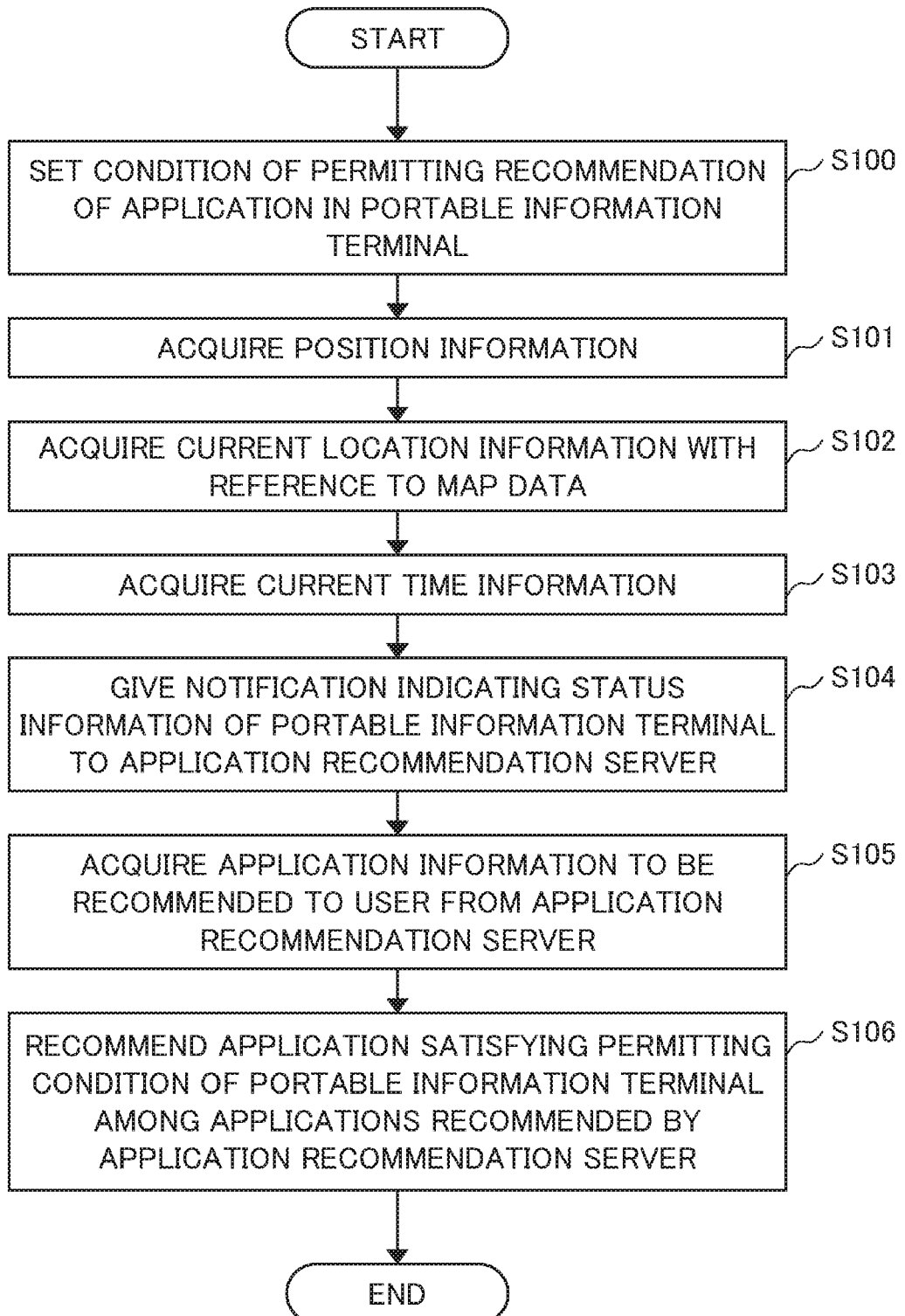
FIG. 4 is a detailed flowchart for describing an application recommendation process according to the first embodiment.

As a series of processes illustrated in FIGS. 3 and 4 are performed as described above, the portable information terminal 100 of the present embodiment recommends only an application satisfying the recommendation permitting condition set in the portable information terminal 100 in advance among applications considered to be desired to be used by the user of the portable information terminal 100 as the recommendation candidate on the basis of the current location information, other information, or the like through the icon display or the like. In other words, when the status of the portable information terminal satisfies the condition corresponding to the application, the application is represented as the recommendation candidate, and when the application further satisfies a pre-set recommendation permitting condition, the application is recommended.

Accordingly, it is possible to reduce the application recommendation congestion and provide the usability suitable for user.

Second Embodiment

In the first embodiment, the icon of the application to be recommended is displayed on the video display unit of the portable information terminal, but the present embodiment will proceed with an example in which the icon of the application to be recommended is displayed on another terminal with a display function linked with the portable information terminal 100. A configuration in the present embodiment is the same as in the first embodiment unless otherwise specified. For this reason, the description will proceed mainly with differences with the first embodiment, and description of common points will be omitted to avoid duplication. Further, even in the portable information terminal 100 of the present embodiment, the application recommendation process is performed in the same manner as in the first embodiment described above.

Figure 7A:
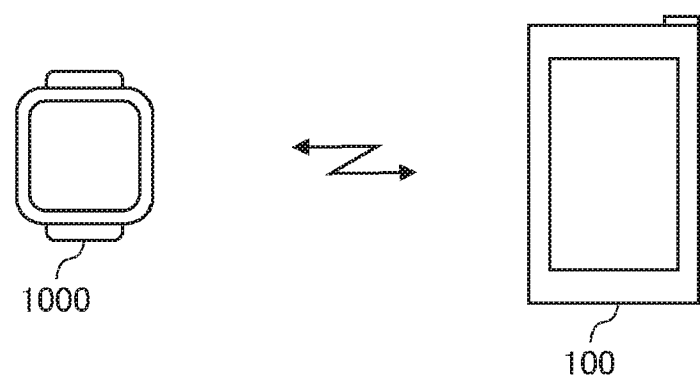
FIG. 7A is a conceptual diagram for describing cooperation between a portable information terminal and a different wristwatch type display terminal according to a second embodiment.

FIG. 7A is a conceptual diagram illustrating cooperation between the portable information terminal according to the present embodiment and a different wristwatch type display terminal. Referring to FIG. 7A, a wristwatch type display terminal 1000 that cooperates with a portable information terminal 100 is provided, and the icon of the recommendation application is displayed on the wristwatch type display terminal 1000 which is a wearable terminal worn on an arm. Accordingly, it is possible to check the icon of the recommendation application through the wristwatch type display terminal 1000 even when the portable information terminal 100 is in a bag or the like.

Figure 7B:
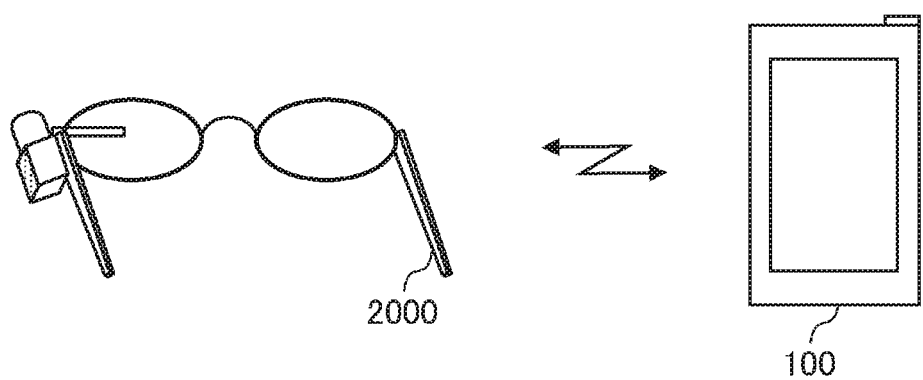
FIG. 7B is a conceptual diagram illustrating cooperation between a portable information terminal and a different glasses type display terminal according to the second embodiment.

FIG. 7B is a conceptual diagram illustrating cooperation between the portable information terminal according to the present embodiment and a different glasses type display terminal. Referring to FIG. 7B, a glasses type display terminal 2000 that cooperates with the portable information terminal 100 is provided, and the icon of the recommendation application is displayed on the glasses type display terminal 2000 which is a wearable terminal worn on the head. Accordingly, it is possible to check the icon of the recommendation application through the glasses type display terminal 2000 even when the portable information terminal 100 is in a bag or the like.

Figure 8A:
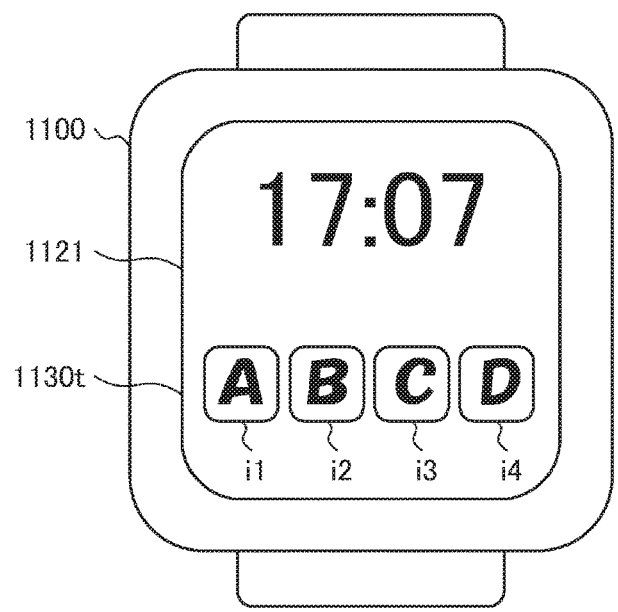
FIG. 8A illustrates a display example of the wristwatch type display terminal of FIG. 7A.

FIG. 8A shows a display example of the wristwatch type display terminal of FIG. 7A. 1100 indicates a main body of the wristwatch type display terminal 1000, 1121 indicates a video display unit, 1130t indicates a touch panel, and icon i1 to i4 displayed on a lower portion of the video display unit 1121 are icons of the recommendation application which are recommended. The icon is selected by performing a manipulation such as tapping or double tapping on the displayed portion of the touch panel 1130t on which the icon is displayed.

Figure 8B:
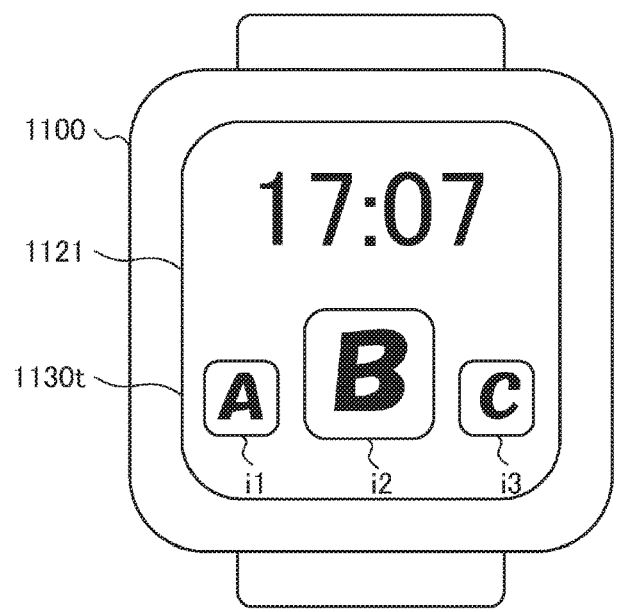
FIG. 8B is another display example of the wristwatch type display terminal in FIG. 7A.

FIG. 8B illustrates another display example of the wristwatch type display terminal of FIG. 7A. A difference from FIG. 8A lies in that the icon i2 of the recommendation application is displayed large. In other words, in the case of the wristwatch type display terminal, the display area is small, and thus only one icon i2 of the recommendation application is displayed large so that it is easy to see and use. In the present embodiment, icons of three recommendation applications are displayed, but the present invention is not limited thereto, and a plurality of icons may be displayed. Further, some icons of a plurality of recommendation applications may be displayed, and the other icons may be scroll-displayed. Further, in a normal display mode, the icon may be displayed with the same size, and the selected icon may be enlarged and displayed.

FIG. 9A illustrates a display example of the glasses type display terminal of FIG. 7B. 2500 indicates a video display unit, and icons i1 to i4 displayed on the video display unit 2500 are icons of the recommendation applications which are recommended.

FIG. 9B illustrates another display example of the glasses type display terminal of FIG. 7B. A difference from FIG. 9A lies in that the icon i2 of the recommendation application is displayed large. In other words, in the case of the glasses type display terminal, the display area is small, and thus only one icon i2 of the recommendation application is displayed large so that it is easy to use when manipulating with an input device. In the present embodiment, icons of three recommendation applications are displayed, but the present invention is not limited thereto, and a plurality of icons may be displayed. Further, some icons of a plurality of recommendation applications may be displayed, and the other icons may be scroll-displayed. Further, in a normal display mode, the icon may be displayed with the same size, and the selected icon may be enlarged and displayed.

As described above, in the present embodiment, the icon of the application to be recommended is displayed on another terminal with a display function linked with the portable information terminal, and thus it is possible to provide the portable information terminal with the excellent usability in which it is possible to check the recommendation application even when the portable information terminal is in a bag or the like.

Third Embodiment

The present embodiment will be described with another example of displaying the recommendation application on the portable information terminal. A configuration in the present embodiment is the same as in the first embodiment unless otherwise specified. For this reason, mainly describe the differences with the first embodiment and omit the explanation for common points in order to avoid duplication.

Figure 10:
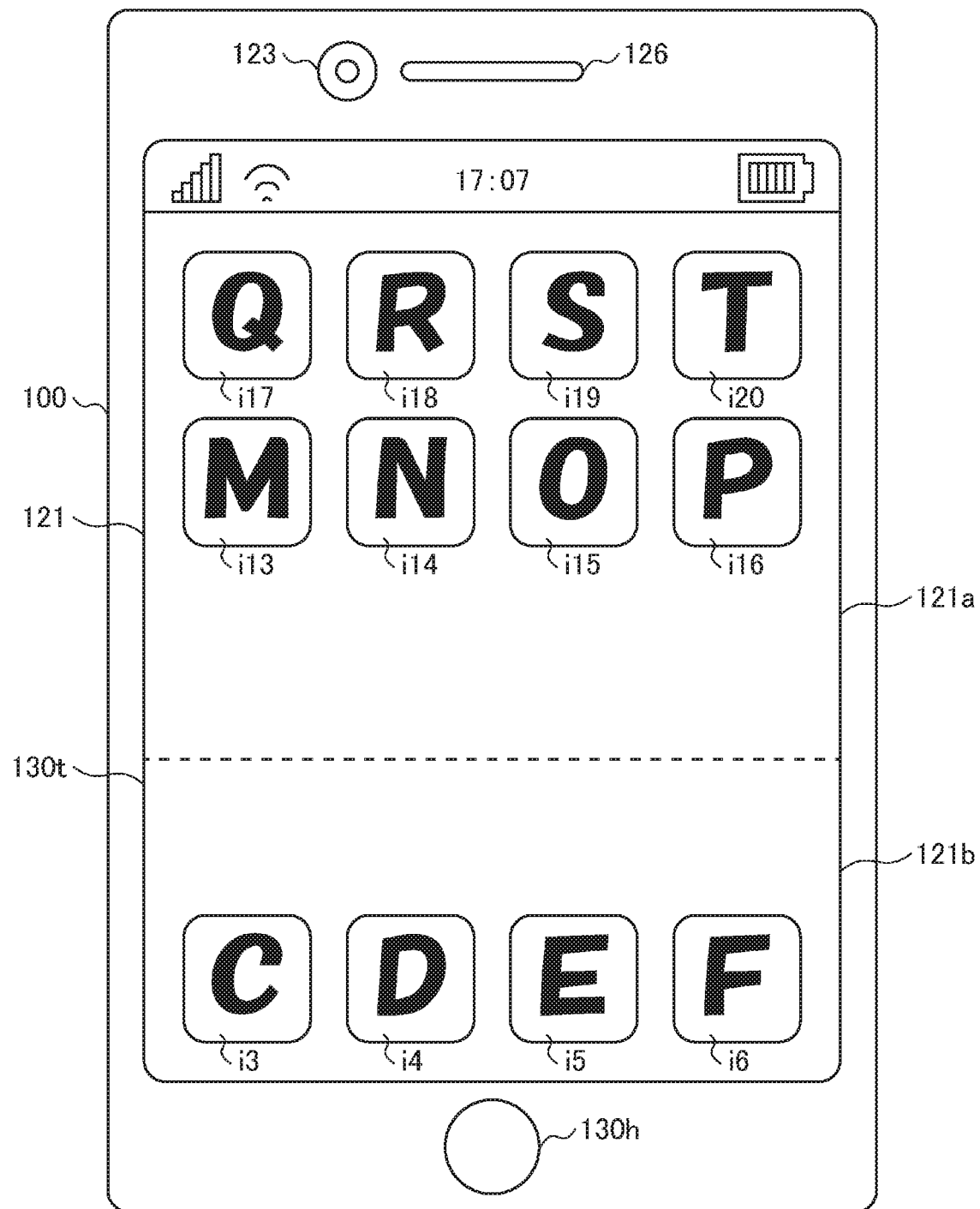
FIG. 10 illustrates a screen display example for describing display of a recommendation application according to a third embodiment.

In the first embodiment, the example of displaying the recommendation application on the portable information terminal has been described with reference to FIG. 6, and the display example according to the present embodiment is illustrated in FIG. 10. Referring to FIG. 10, components having the same reference numerals as those in FIG. 6 are assumed to have the same configuration/operation as those in FIG. 6, and description thereof is omitted. A difference from FIG. 6 lies in that the video display unit 121 is divided into 121a and 121b, icons i13 to i20 associated with various kinds of applications stored in the portable information terminal 100 (or data generated by the respective applications) are displayed on the display region 121a, and icons i3 to i6 of the recommendation application are displayed on the display region 121b. As described above, since the icon display region of the recommendation application is completely divided into the icon display region of various kinds of applications stored in the usual portable information terminal 100, it is possible to perform swiping or the like in each area individually, and it is possible to prevent an erroneous manipulation. Further, since the display region is completely separated, the visibility of the recommendation application is improved.

Figure 11:
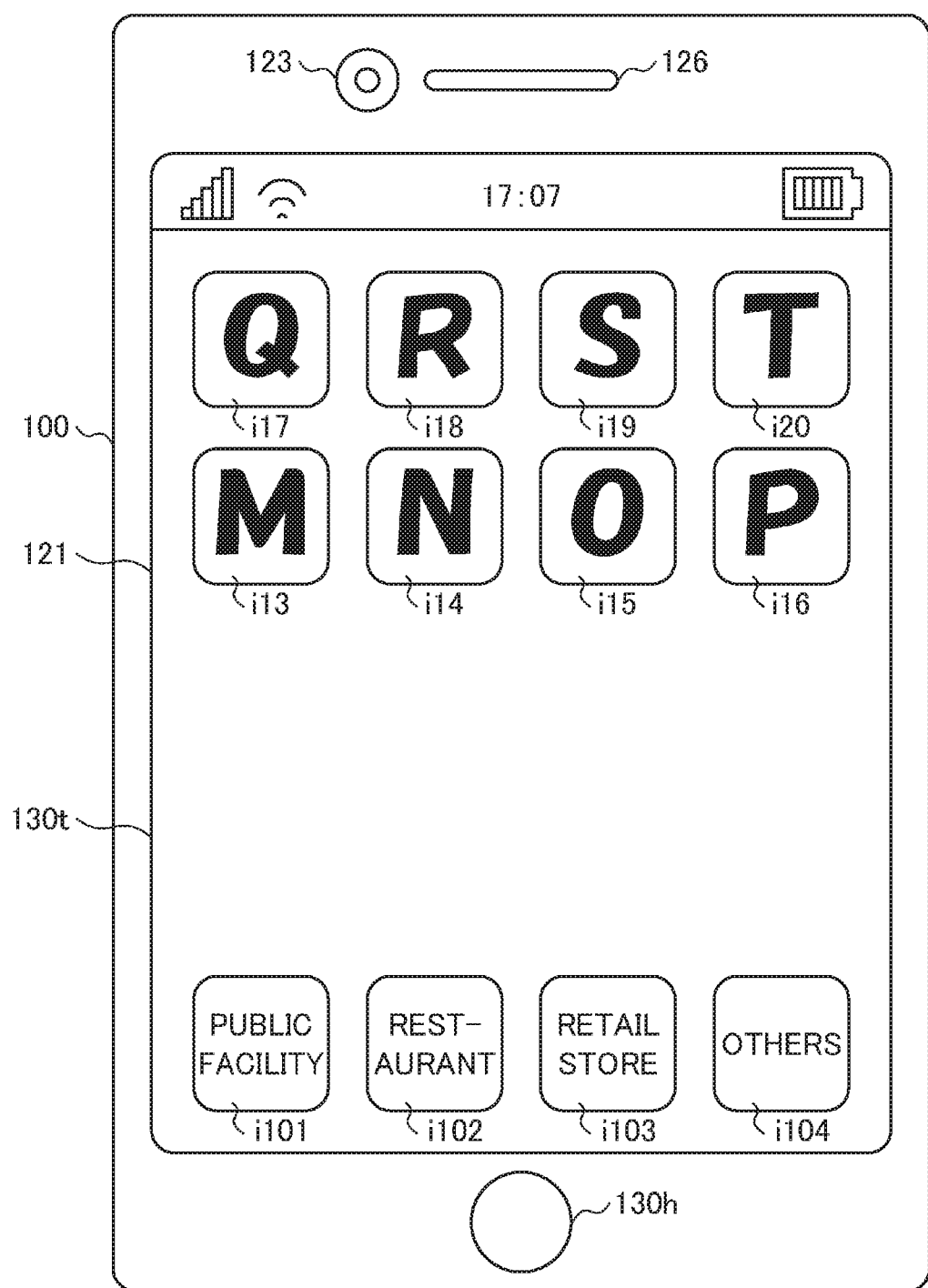
FIG. 11 illustrates a screen display example for describing another display of a recommendation application according to the third embodiment.

FIG. 11 is another display example according to the present embodiment. Referring to FIG. 11, components having the same reference numerals as those in FIG. 6 are assumed to have the same configuration/operation as those in FIG. 6, and description thereof is omitted. In FIG. 6, the icons of the recommendation applications are displayed for each application, but in FIG. 11, the icons are displayed for each category which is a type of facility associated with the application. In other words, referring to FIG. 11, an icon i101 is an icon for selecting a recommendation application associated with public facilities, an icon i102 is an icon for selecting a recommendation application associated with restaurants, an icon i103 is an icon for selecting a recommendation application associated with retail stores, and an icon i104 is an icon for selecting other recommendation applications. As described above, the representative icons are displayed for each type of recommended application. It is possible to hierarchically select the recommendation application for each category by selecting the icons i101 to i104 for each category. As described above, according to the present embodiment, there are advantages in that the icon display region of the recommendation application can be reduced, and the display region of the portable information terminal can be effectively used.

Figure 12:
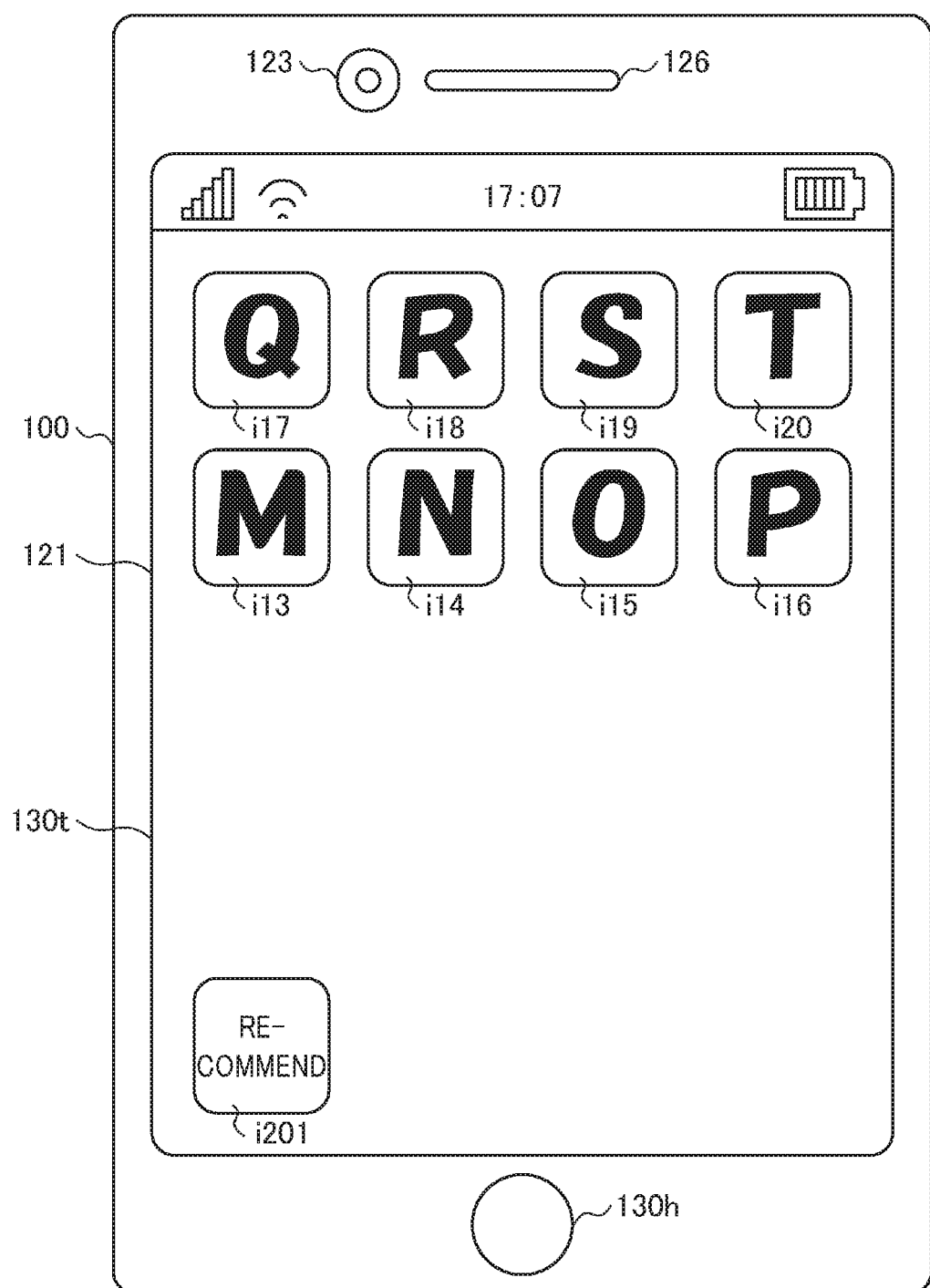
FIG. 12 illustrates a screen display example illustrating another display of a recommendation application according to the third embodiment.

FIG. 12 is yet another display example according to the present embodiment. In FIG. 12, components having the same reference numerals as those in FIG. 6 are assumed to have the same configuration/operation as those in FIG. 6, and description thereof is omitted. In FIG. 12, one of features of the present embodiment lies in that an icon i201 is arranged. In other words, the icon i201 is an icon displayed when there is a recommendation application, and the icon i201 is an icon indicating that an application is recommended. It is possible to select the recommendation application by selecting the icon i201. Even when there is no recommendation application, the icon i201 may be displayed, and a color or a shape of the icon i201 may be changed to give a notification indicating that there is a recommendation application. Further, it is possible to improve the visibility of the recommendation application by fixing the location of the icon i201. According to the present embodiment, since it is possible to display the recommendation application with one icon, there is an advantage in that the display region of the portable information terminal can be effectively used.

Figure 13:
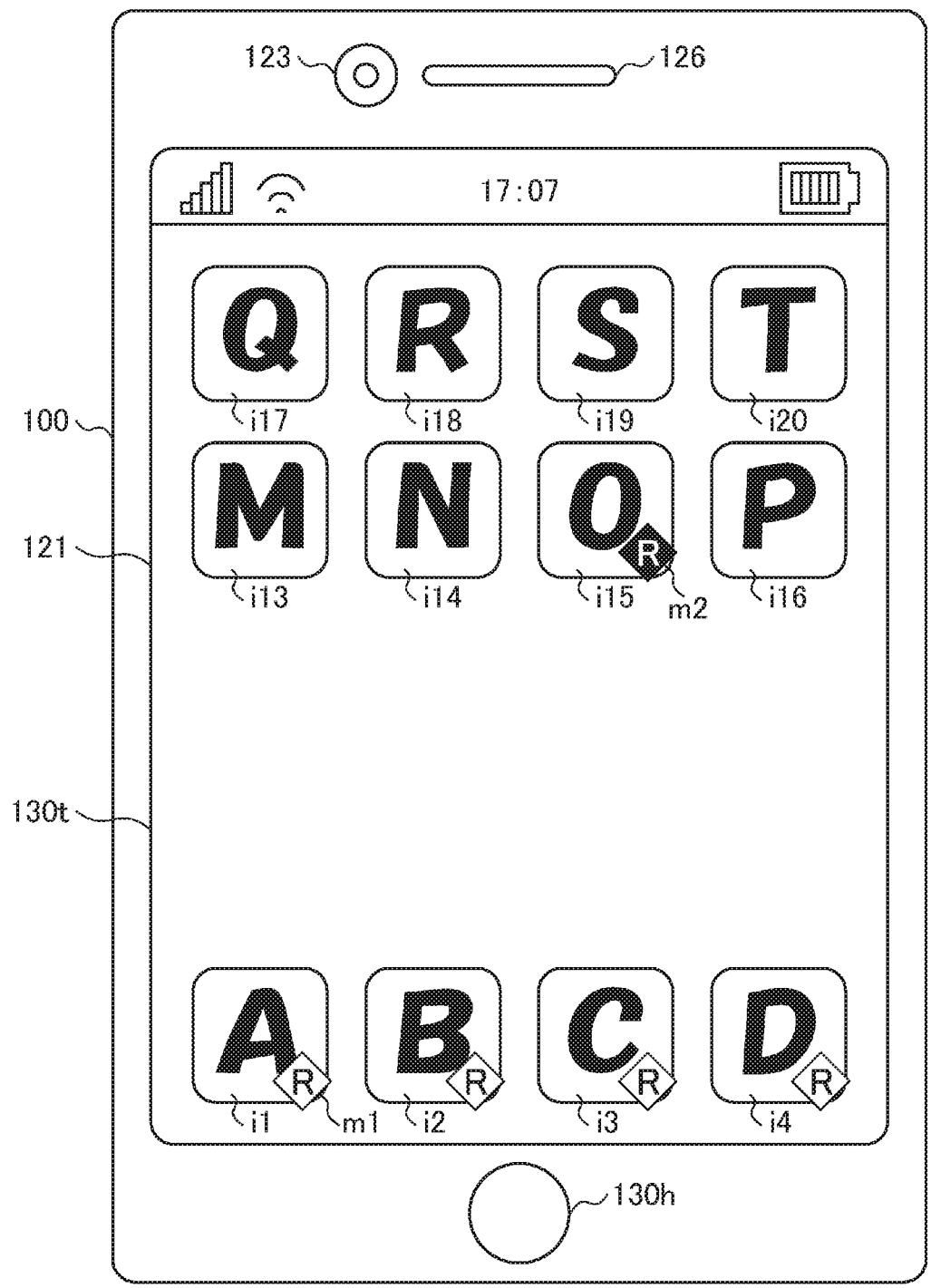
FIG. 13 illustrates a screen display example illustrating another display of a recommendation application according to the third embodiment.

FIG. 13 is yet another display example according to the present embodiment. In FIG. 13, components having the same reference numerals as those in FIG. 6 are assumed to have the same configuration/operation as those in FIG. 6, and description thereof is omitted. In FIG. 13, icons i1 to i4 are icons of the recommendation applications, a R mark (meaning Recommendation) indicated by m1 indicates a state in which the recommended application is not downloaded to the portable information terminal 100 yet, and a white R mark indicated by m2 of an icon i15 indicates that an application indicated by the icon is already downloaded to the portable information terminal 100. As described above, since the mark indicating whether or not the application is downloaded is displayed on the icon of the recommendation application, it is possible to determine whether or not the recommendation application is downloaded by viewing the icon, and thus there is an effect in that time and efforts to select the icon and check whether or not the application is downloaded can be saved. Therefore, for example, when there is no time, it is possible to implement determination of whether or not a non-downloaded recommendation application is downloaded later without unnecessary manipulation.

Figure 14:
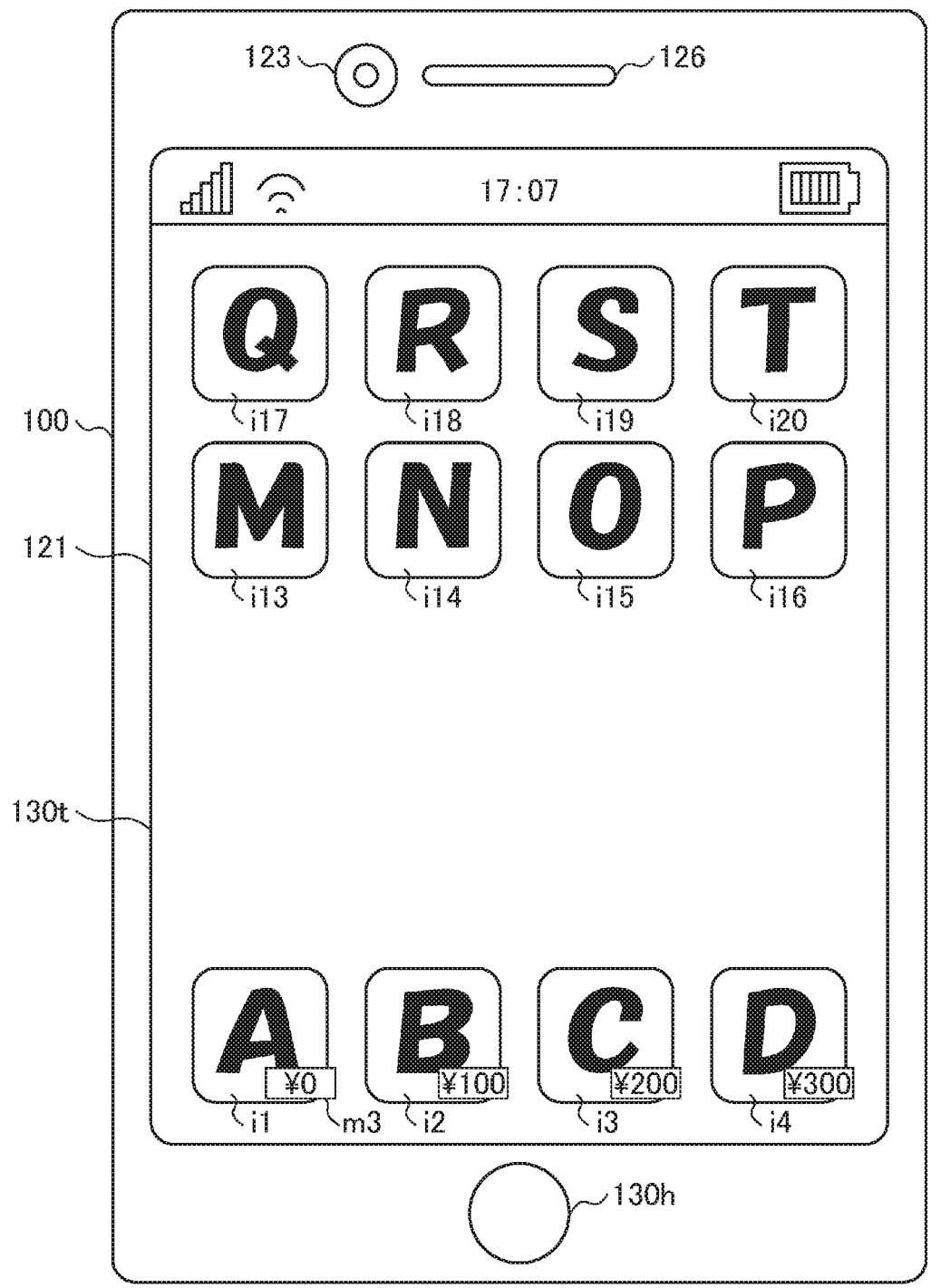
FIG. 14 illustrates a screen display example illustrating another display of a recommendation application according to the third embodiment.

FIG. 14 is yet another display example according to the present embodiment. In FIG. 14, components having the same reference numerals as those in FIG. 6 are assumed to have the same configuration/operation as those in FIG. 6, and description thereof is omitted. In FIG. 14, icons i1 to i4 are icons of the recommendation applications, and a display indicated by m3 indicates a usage fee of the recommended application. Since the usage fee of the application is displayed in advance as described above, for example, it is possible to ignore advertising applications when they are free, and thus there is an effect in that it is not necessary to check a website each time.

Fourth Embodiment

The present embodiment will be described with a recommendation application display restriction in the portable information terminal. A configuration in the present embodiment is the same as in the first embodiment unless otherwise specified. For this reason, the description will proceed mainly with differences with the first embodiment, and description of common points will be omitted to avoid duplication.

Figure 15:
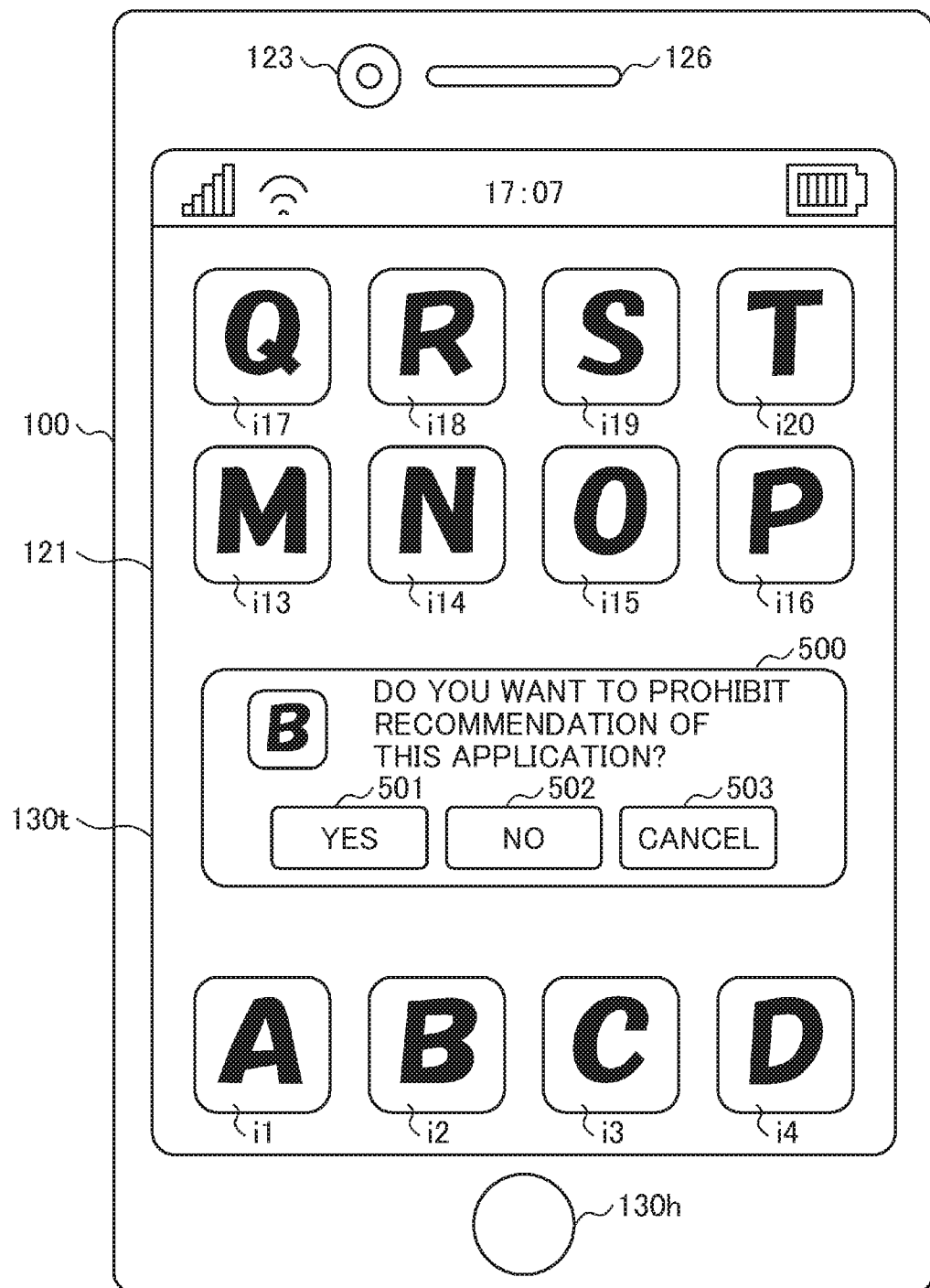
FIG. 15 illustrates a screen display example for describing a recommendation application display restriction according to a fourth embodiment.

FIG. 15 is a screen display example illustrating a recommendation application display restriction in the present embodiment. In FIG. 15, components having the same reference numerals as those in FIG. 6 are assumed to have the same configuration/operation as those in FIG. 6, and description thereof will be omitted. In FIG. 15, reference numeral 500 denotes a display window having selection buttons 501 to 503 appearing when, for example, a flick operation is performed on an icon i2 of the recommendation application, and when it is not desired to receive the recommendation application indicated by i2, display is performed so that selection of prohibiting the recommendation application process hereafter can be performed. In a case in which the recommendation application process is prohibited hereafter, it is possible to prohibit the display of the recommendation application hereafter by selecting a "Yes" button 501. In other words, a setting function of prohibiting recommendation of a specific application is provided, and thus it is possible to perform a setting so that a preset application is not recommended.

Figure 16:
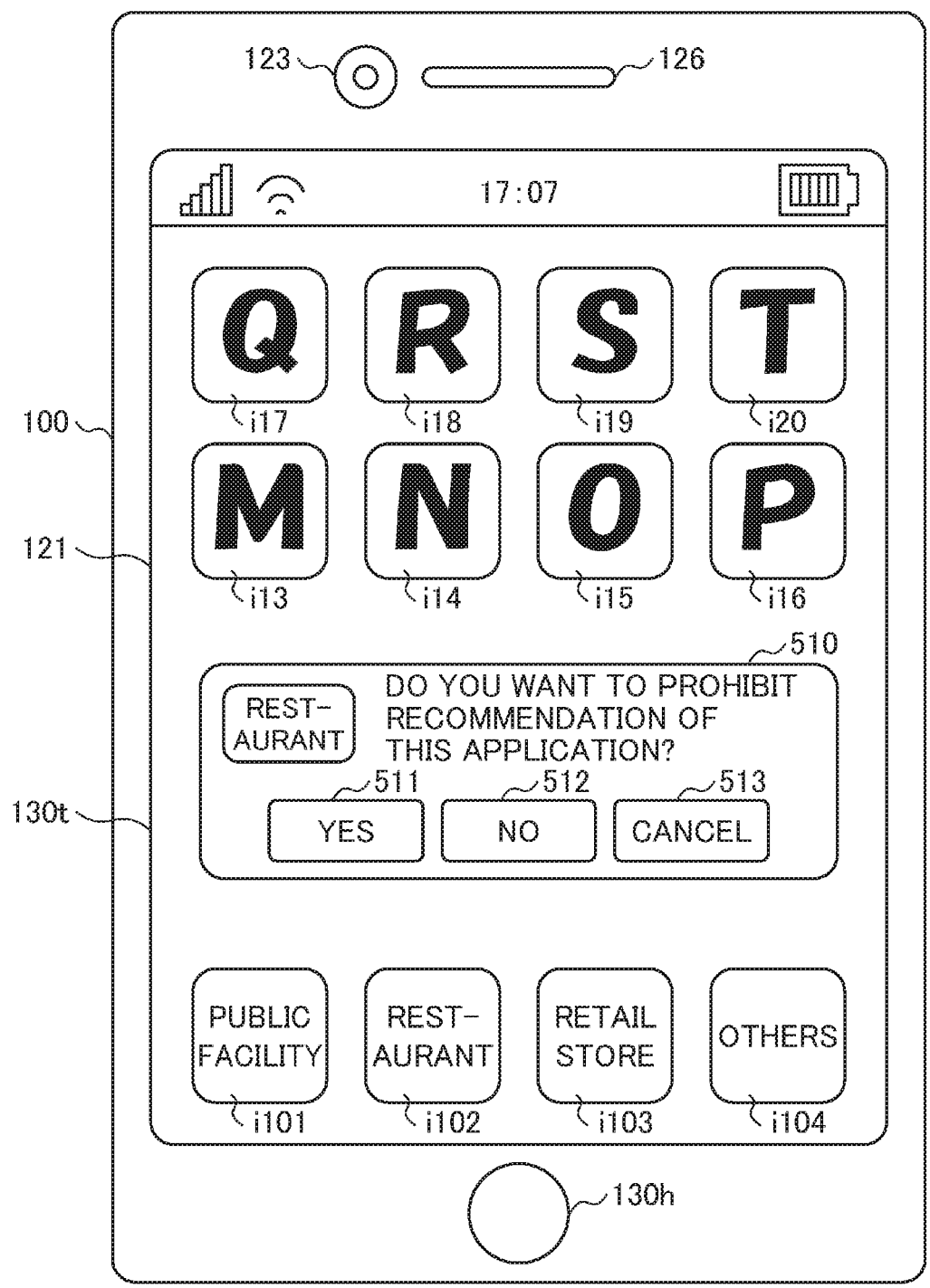
FIG. 16 illustrates a screen display example for describing a recommendation application display restriction according to the fourth embodiment.

FIG. 16 is another screen display example for describing the recommendation application display restriction according to the present embodiment. In FIG. 16, the icons of the recommendation applications of the categories which are the types of facilities associated with the applications corresponding to FIG. 11 are displayed as i101 to i104. A display window having selection buttons 511 to 513 appearing when, for example, the flick operation is performed on one of i101 to i104 is 510, and it is possible to prohibit the display of the recommendation application for each category on which the flick operation is performed. For example, in a case in which the recommendation applications associated with restaurants are not necessary, when the flick operation is performed on the icon i102, the selection screen 510 is displayed, and it is possible to prohibit the display of the recommendation application associated with the restaurants hereinafter by selecting "Yes" of 511. In other words, since the setting function of prohibiting recommendation of a specific type of application is provided, it is possible to perform a setting so that a preset type of application is recommended.

Further, when the icons i101 to i104 of the recommendation applications of the respective categories are selected, the icons of the recommendation applications may be hierarchically displayed, and the display of the recommendation applications corresponding to the icons may be prohibited.

Further, in FIG. 5, the example of the setting of the application recommendation permitting condition is illustrated in FIG. 5, and the example of setting whether or not the recommendation is permitted for each category has been described, but it is the case of setting the condition of the application permitted to be recommended in advance. In the recommendation application display restriction according to the present embodiment, it is selected whether or not the display restriction is applied to the recommended application.

As described above, according to the present embodiment, the recommendation application display restriction can be performed on the actually recommended application.

Fifth Embodiment

The present embodiment will be described with a setting of a permission of reference to information for selecting the recommendation application in the portable information terminal. A configuration in the present embodiment is the same as in the first embodiment unless otherwise specified. For this reason, the description will proceed mainly with differences with the first embodiment, and description of common points will be omitted to avoid duplication.

Figure 17:
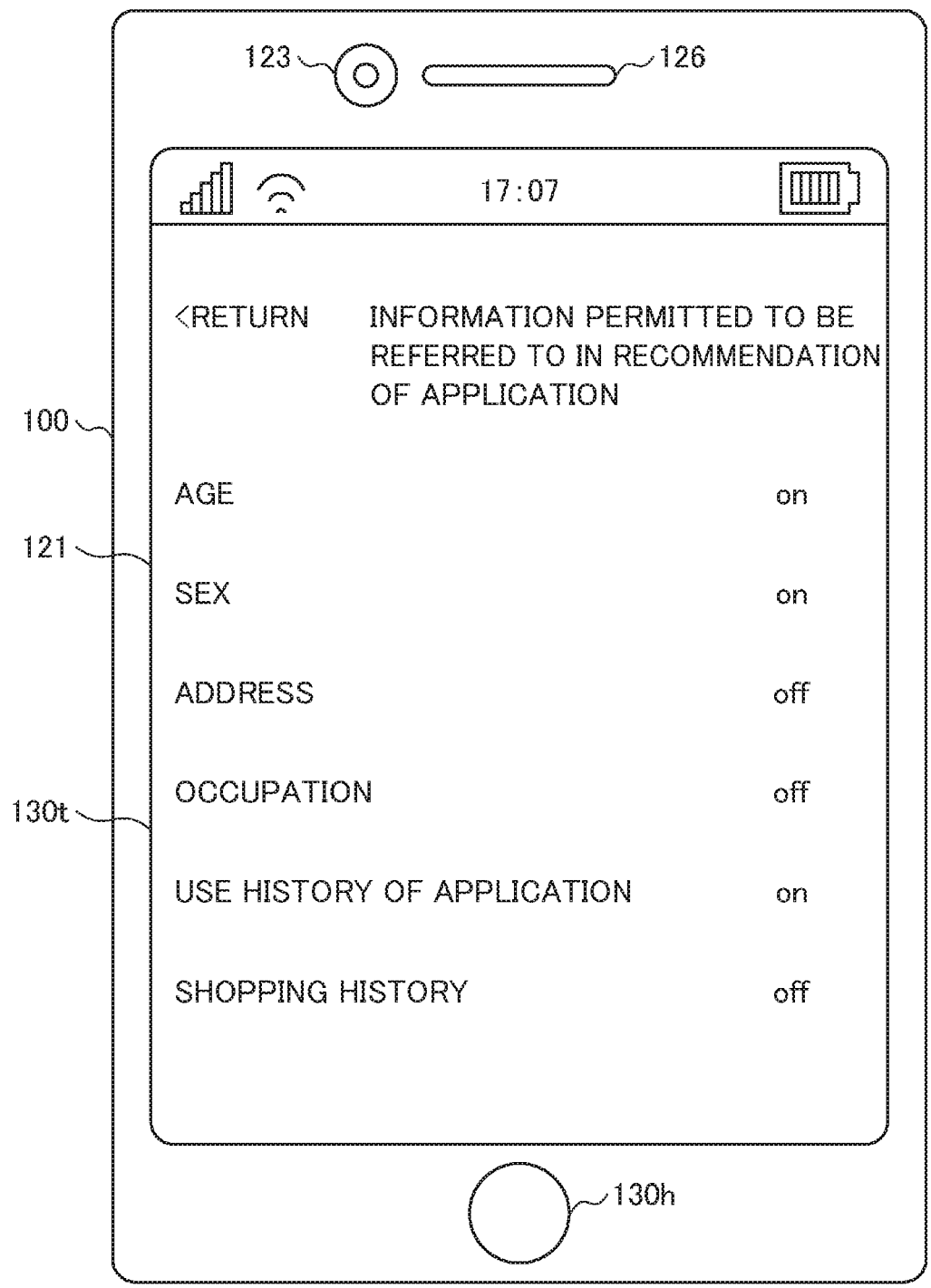
FIG. 17 illustrates a screen display example for describing a setting of a permission of reference to information for selecting a recommendation application according to a fifth embodiment.

FIG. 17 is a screen display example for description a setting of a permission of reference to information for selecting the recommendation application according to the present embodiment. As the information for selecting the recommendation application, for example, information indicating an age, a sex, an address, an occupation, or the like of the user of the portable information terminal may be transmitted to the application recommendation server 211b, and the application recommendation server 211b may select the recommendation application considered to be suitable for the user of the portable information terminal in view of information related to the user of the portable information terminal in addition to the status information of the portable information terminal and give a notification indicating information of the application to the portable information terminal. However, since the information related to the users is personal information, it is necessary to set a permission of reference to the information. In this regard, as illustrated in FIG. 17, a screen for setting whether or not reference to information related to the user of the portable information terminal such as an age, a sex, an address, or an occupation of the user of the portable information terminal is permitted is provided. Here, "on" indicates permission, and "off" indicates non-permission, and in the case of "on," the information is transmitted to the application recommendation server 211b, and the information is provided. In the case of "off," the information is not transmitted to the application recommendation server 211b, and the information is not provided. Further, switching between "on" and "off" is performed by tapping an on/off display part.

In addition to the information related to the user of the portable information terminal, information such as a use history or a shopping history of an application is also effective as the information for selecting the recommendation application on the application recommendation server side. Therefore, a setting of whether or not reference to such information is permitted may be performed as well.

As described above, since it is possible to set whether or not the reference to the information for selecting the recommendation application is permitted on the application recommendation server side, personal information protection can be implemented.

Sixth Embodiment

The present embodiment will be described with an example of storing the display of the recommendation application in the portable information terminal. A configuration in the present embodiment is the same as in the first embodiment unless otherwise specified. For this reason, the description will proceed mainly with differences with the first embodiment, and description of common points will be omitted to avoid duplication.

In the first embodiment, the icon of the recommended application may be displayed until the condition related to the status of the portable information terminal does not satisfy the recommendation condition or may be displayed for a certain period of time. It has been described above that alternatively, it may be erased in accordance with an operation such as a flick operation performed by the user. The present embodiment relates to a setting screen when it is desired to store an icon of an application which is recommended once and display it continuously.

Figure 18:
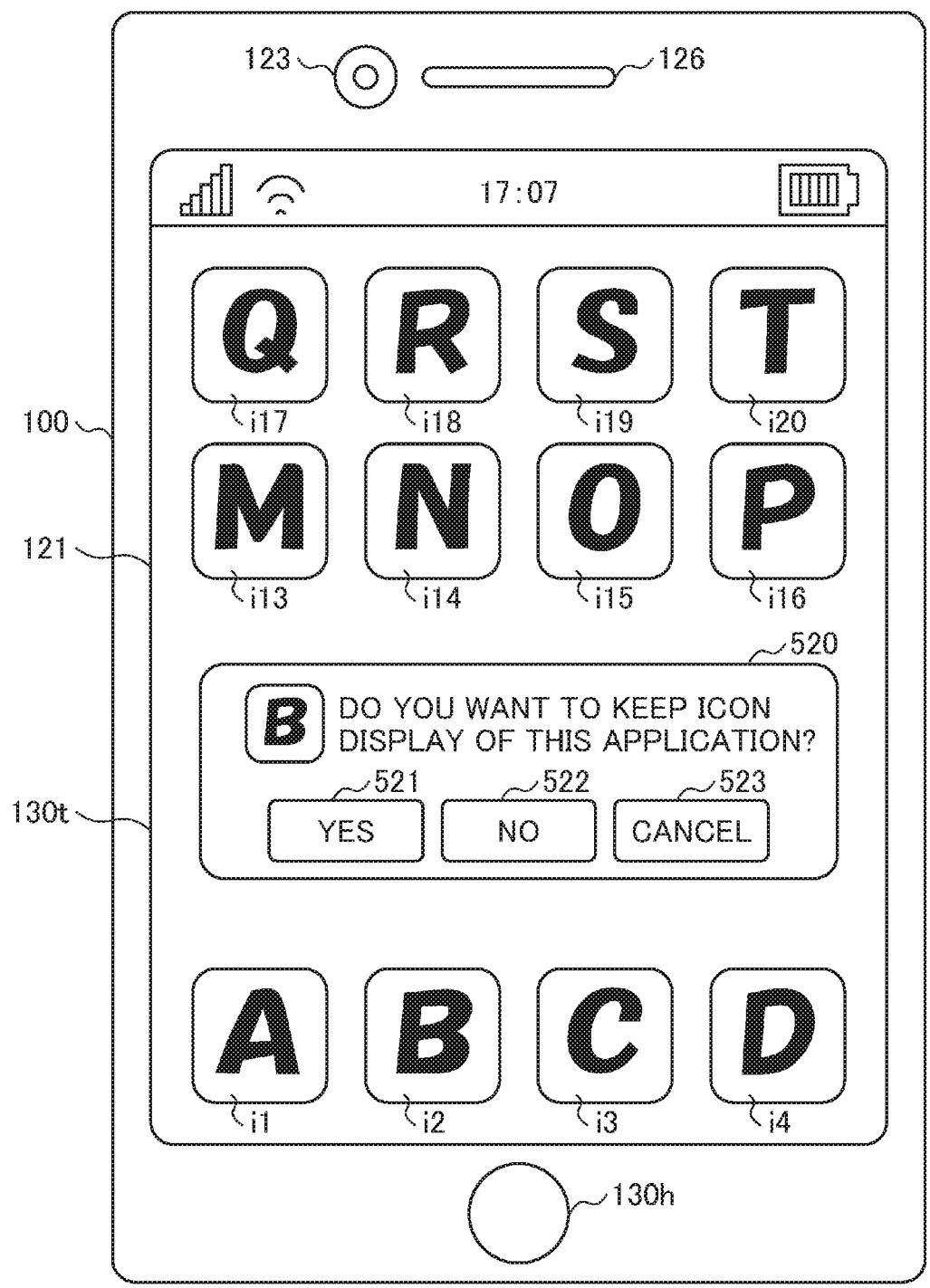
FIG. 18 illustrates a screen display example for describing a setting for storing an icon of a recommendation application according to a sixth embodiment.

FIG. 18 is a screen display example for describing a setting for storing the icon of the recommendation application according to the present embodiment. In FIG. 18, reference numeral 520 denotes a display window having selection buttons 521 to 523 appearing when, for example, a flick operation is performed on the icon i2 of the recommendation application, and an example in which display is performed so that selection of desiring to store the icon of the application indicated by i2 and display the icon continuously can be performed is illustrated. In a case in which it is desired to store the icon of the recommended application, it is possible to store the icon of the recommended application by selecting a "Yes" button 521 and continuously display the icon, for example, even when the conditions related to the status of the portable information terminal do not satisfy the recommendation condition. Specifically, for a service application of a certain retail store, even when the user of the portable information terminal is part from the retail store, it is possible to continuously display the icon of the service application.

Seventh Embodiment

The present embodiment will be described with an option setting of the recommendation application. A configuration in the present embodiment is the same as in the first embodiment unless otherwise specified. For this reason, the description will proceed mainly with differences with the first embodiment, and description of common points will be omitted to avoid duplication.

Figure 19:
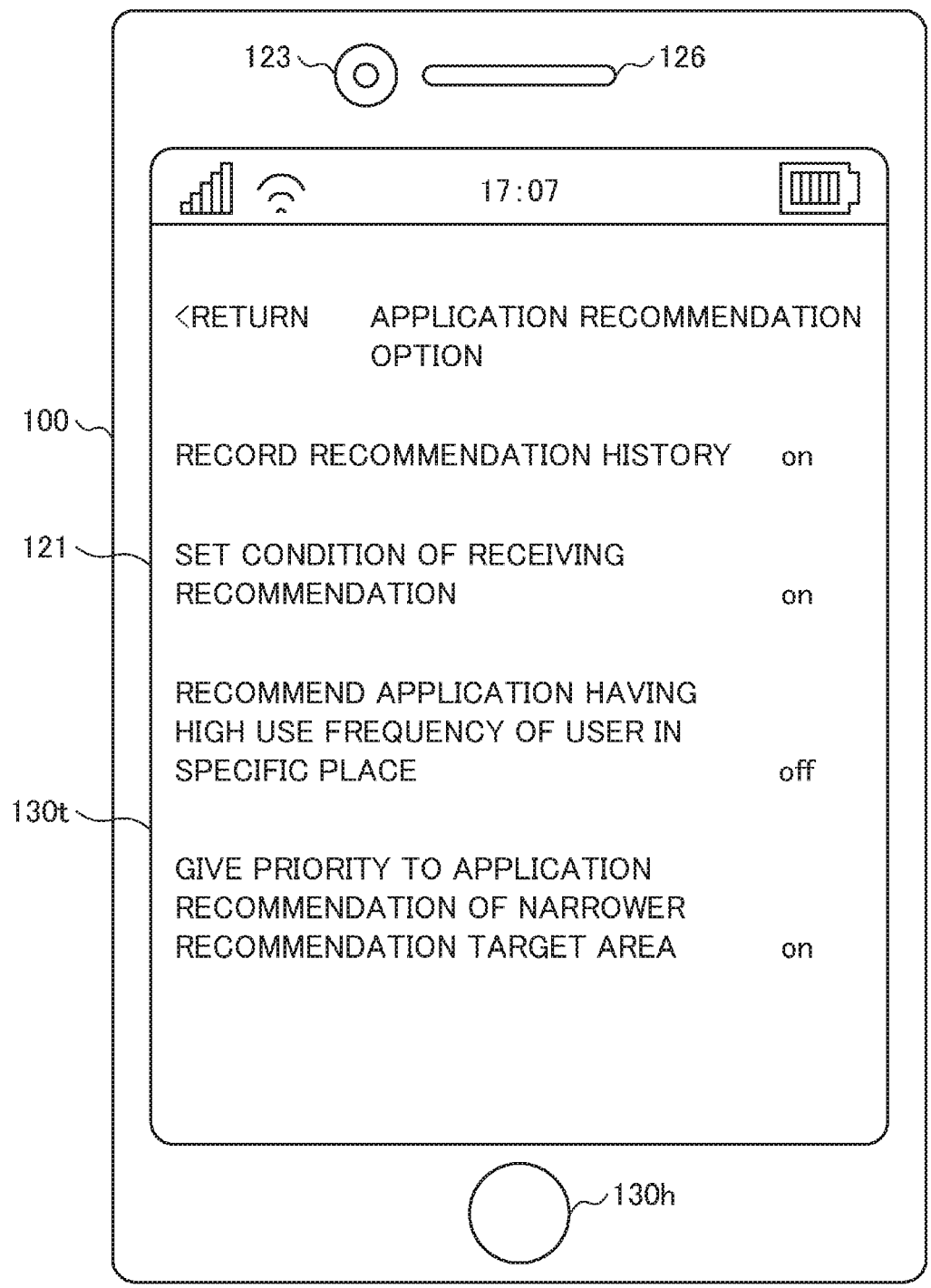
FIG. 19 illustrates a screen display example for describing an option setting of a recommendation application according to a seventh embodiment.

FIG. 19 is a screen display example for describing the option setting of the recommendation application according to the present embodiment. In FIG. 19, as the option setting, there is on/off of the history of the recommendation application. Further, there is a setting of whether or not a condition for receiving the recommendation is set. For example, when "off" is set by default, and the user of the portable information terminal does not perform a setting, it is possible to simplify a complicated setting. There is also a setting of whether or not an application having a high use frequency in a specific place is recommended. This can be used, for example, when a popular application is recommended Regardless of the status of the portable information terminal, but "off" is set when it is desired to display the recommendation application in accordance with the status of the portable information terminal. There is also a setting of whether or not a priority is given to application recommendation of a narrower recommendation target area. This is an option set when it is desired to perform the application recommendation in a narrower range than a conventional target area, and for example, it is effective when there are too many recommendation applications in the target area, it is complicated, and it is desired to narrow down to a few more cases. Conversely, an option for giving a priority to application recommendation of a wide recommendation target area may be set.

Eighth Embodiment

The present embodiment will be described with a recommendation application history screen. A configuration in the present embodiment is the same as in the first embodiment unless otherwise specified. For this reason, the description will proceed mainly with differences with the first embodiment, and description of common points will be omitted to avoid duplication.

Figure 20:
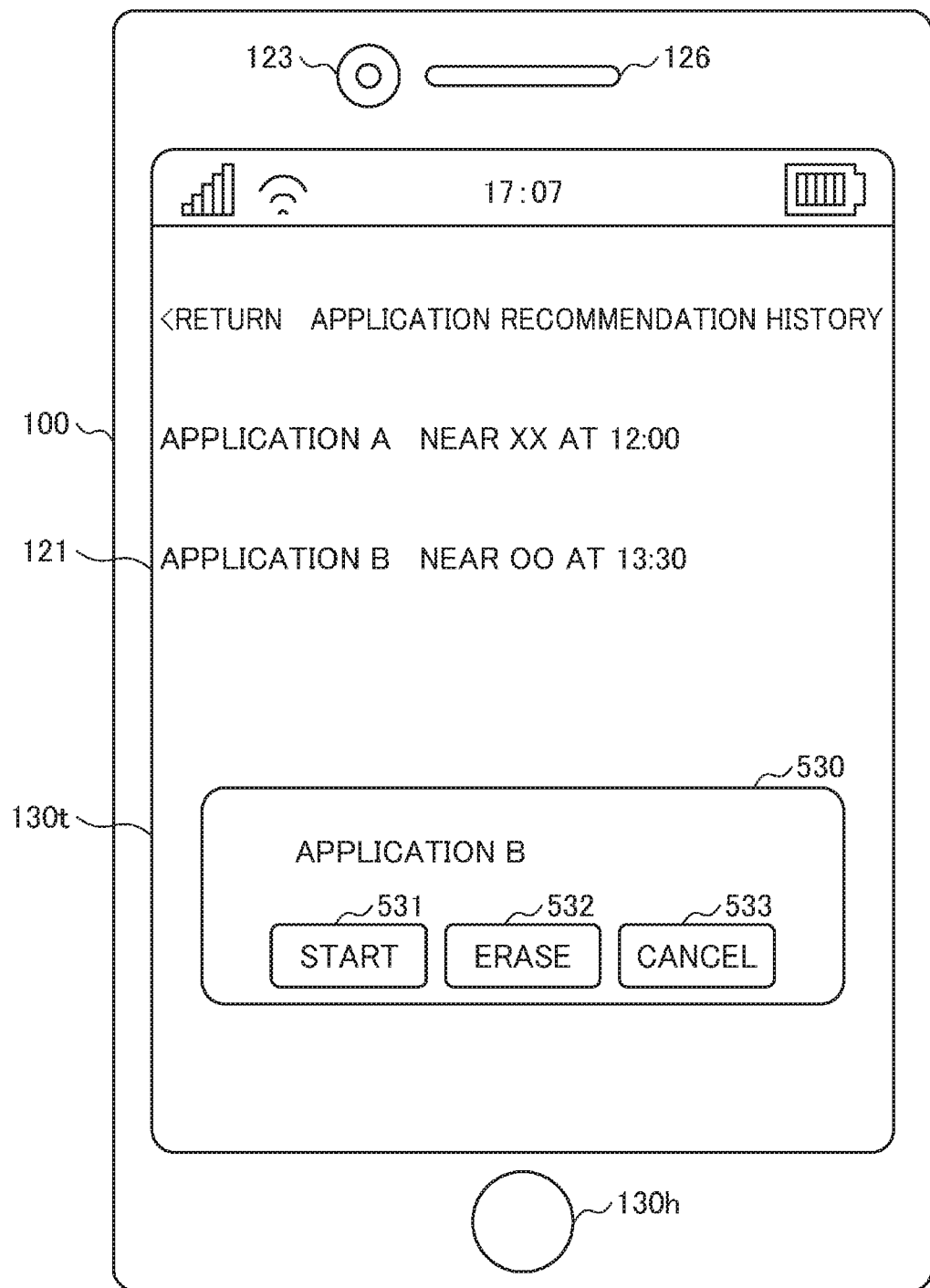
FIG. 20 illustrates a screen display example for describing a recommendation application history screen according to an eighth embodiment.

FIG. 20 is a screen display example for describing a recommendation application history screen according to the present embodiment. In FIG. 20, as the recommendation application history screen, for example, as a recommendation history of an application A and an application B, a place and a time at the time of recommendation are displayed. It is possible to check the recommendation application from the history screen later, for example, when there is no time to check the recommendation application while walking when recommended. In a case in which it is desired to execute the recommendation application, it is possible to select an activation button 531 in a display window 530 appearing when the application is selected and execute a desired application. If the history of the recommendation application is unnecessary, the desired application can be deleted by selecting a delete button 532 in the display window 530.

Ninth Embodiment

The present embodiment will be described with an example of setting a condition for prohibiting the application recommendation. A configuration in the present embodiment is the same as in the first embodiment unless otherwise specified. For this reason, the description will proceed mainly with differences with the first embodiment, and description of common points will be omitted to avoid duplication.

Figure 21:
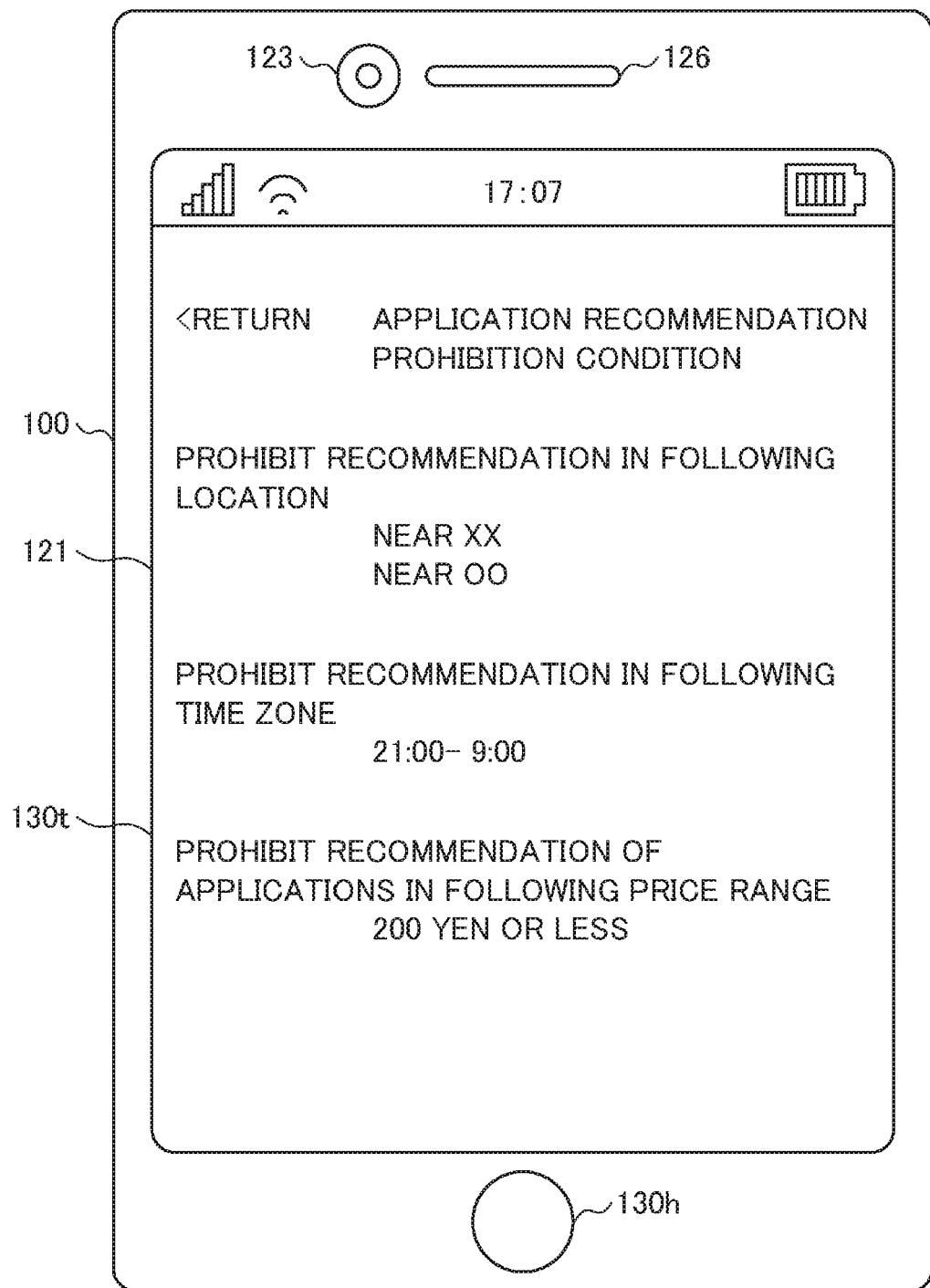
FIG. 21 illustrates a screen display example for setting an application recommendation prohibiting condition according to a ninth embodiment.

FIG. 21 is a screen display example of setting a condition for prohibiting the application recommendation according to the present embodiment. In FIG. 21, as the condition for prohibiting the application recommendation, there is a setting of prohibiting the recommendation in a predetermined place. For example, for example, when advertising applications are flooding and become troublesome in a shopping street of a certain place, it is possible to perform a setting so that the recommendation is prohibited in that place. There is also a setting of prohibiting the recommendation in accordance with a predetermined time zone. For example, when it is a business time zone or a sleeping time zone, it is unable to be dealt with even when the recommendation application is displayed, and thus it is possible to perform a setting of prohibiting those time zones in advance. It is also possible to combine it with a day of week. There is also a setting of prohibiting the recommendation in accordance with an application price range. For example, when a cheap application is low in a value and regarded as being unnecessary or when an advertising application is free and regarded as unnecessary, the setting can be performed.

As described above, according to the present embodiment, it is possible to prevent the presentation of an unnecessary recommendation application by setting the condition for prohibiting the application recommendation on the portable information terminal side.

Tenth Embodiment

The present embodiment will be described with an example of setting the recommendation condition to known applications. A configuration in the present embodiment is the same as in the first embodiment unless otherwise specified. For this reason, the description will proceed mainly with differences with the first embodiment, and description of common points will be omitted to avoid duplication.

Figure 22:
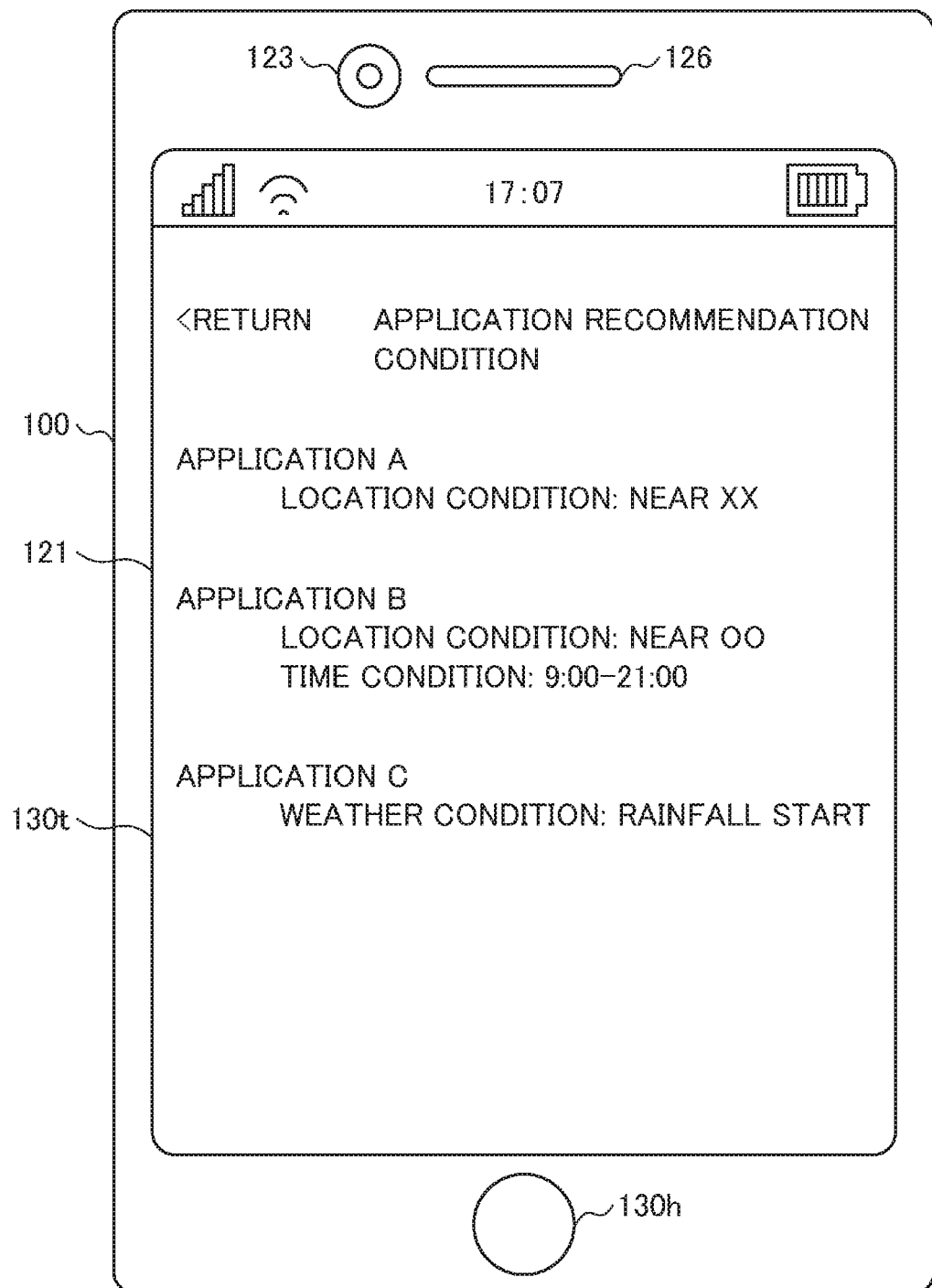
FIG. 22 illustrates a screen display example for setting an application recommendation condition according to a tenth embodiment.

FIG. 22 is a screen display example for setting the application recommendation condition according to the present embodiment. In FIG. 22, applications A, B, and C are already known and used when it is desired to notify of the applications as the recommendation applications in accordance with the set condition. For example, for the application A, a location condition is set when it is desired to go to a certain place and see the latest information through the application. For the application B, in addition to the location condition, a time condition is also set. For example, it can be used when it is desired to narrow down to business hours of stores and use a daily service at a favorite store. For the application C, a weather condition is set.

As described above, according to the present embodiment, the user of the portable information terminal sets the recommendation condition to the known applications, and a desired application is recommended and presented under a predetermined condition, and thus it is possible to prevent forgetting carelessly.

The embodiments of the present invention have been described above, but the configuration for implementing the technology of the present invention is not limited to the embodiments. For example, a configuration of one embodiment may be combined with a configuration of another embodiment. All of these belong to the scope of the present invention. Further, numerical values, messages, or the like shown in the sentences or the drawings are merely examples, and the effects of the present invention are not damaged although different things are used.

Further, the functions or the like of the present embodiment may be implemented by hardware, for example, may be designed by an integrated circuit. Further, the functions or the like of the present embodiment may be implemented by software by interpreting and executing a program of implementing the functions through a microprocessor unit or the like. The program may be stored in the ROM 103 or the storage unit 110 of the portable information terminal 100 in advance, and the program may be acquired from the application server 211*a* on the Internet 201 through the LAN communication unit 141 or the mobile telephone network communication unit 142. Further, the program stored in a memory card or the like may be acquired through the extended interface unit 170.

Further, a control line or an information line is illustrated since they are necessary for description, and all control lines or information lines necessary in a product are not necessarily illustrated. Practically, almost all the components may be considered to be connected to one another.

The invention claimed is:

1. A portable information terminal configured to communicate with an external terminal, the portable information terminal comprising:
a display which can display a condition set in advance;
a communication circuitry transmits first information indicating a status of the portable information terminal to a server, and receives, as second information, recommended options which are determined as satisfying a first condition based on the first information; and
a controller configured to determine firstly-selected one or more recommended options that satisfy a second condition set in advance from the second information received via the communication circuitry,
wherein the communication circuitry further transmits third information related to the firstly-selected one or more recommended options determined by the controller to the external terminal, and receives a secondly-selected one or more recommended options selected by the external terminal based on the third information as fourth information,
wherein the controller is further configured to:
determine whether an application relating to the fourth information has been downloaded to the portable information terminal;
in response to a determination that the application has not been downloaded, connect to the server to make the application downloadable via the communication circuitry;
control the communication circuitry to transmit status information to the external terminal; and
when receiving instruction information from the external terminal after the communication circuitry transmits the status information to the external terminal, control the communication circuitry to download the application from the server and display the application on the display according to the received instruction information.

2. The portable information terminal according to claim 1, wherein the second condition set in advance relates to category, usage fee range or time zone.

3. The portable information terminal according to claim 1, further comprising a GPS signal receiver,
wherein the first condition is any one of a position of the portable information terminal, a season, a time, a weather at the position of the portable information terminal, and an attribute of a user of the portable information terminal, or is a combination of a plurality of conditions selected from the position of the portable information terminal, the season, the time, the weather at the position of the portable information terminal, and the attribute of the user of the portable information terminal.

4. The portable information terminal according to claim 1, wherein the first condition is history information.

5. The portable information terminal according to claim 1, further comprising a memory that records the second information so that the recommended options are able to be referred to even when the status of the portable information terminal does not satisfy the first condition.

6. The portable information terminal according to claim 5, wherein the memory records a history of the recommended options.

7. The portable information terminal according to claim 1, wherein the communication circuitry comprises:
a first communication circuitry configured to perform wireless communication via an access point for wireless communication on the Internet,
a second communication circuitry configured to perform wireless communication via a base station of a telephone communication network, and
a third communication circuitry configured to perform proximity wireless communication.

8. The portable information terminal according to claim 7, wherein the first information indicating the status of the portable information terminal is transmitted to the server by the first communication circuitry or the second communication circuitry.

9. A method for a portable information terminal configured to communicate with an external terminal, the method comprising:
displaying a condition set in advance;
transmitting, by a communication circuitry, first information indicating a status of the portable information terminal to a server;
receiving, by the communication circuitry, as second information, recommended options which are determined as satisfying a first condition based on the first information;
determining firstly-selected one or more recommended options that satisfy a second condition set in advance from the second information via the communication circuitry;
transmitting, by the communication circuitry, third information related to the firstly-selected one or more recommended options to the external terminal;
receiving a secondly-selected one or more recommended options selected by the external terminal based on the third information as fourth information;
determining whether an application relating to the fourth information has been downloaded to the portable information terminal;
in response to a determination that the application has not been downloaded, connecting to the server to make the application downloadable via the communication circuitry;
controlling the communication circuitry to transmit status information to the external terminal; and
when receiving instruction information from the external terminal after the communication circuitry transmits the status information to the external terminal, downloading the application from the server and display the application on the display according to the received instruction information.

10. The method according to claim 9, wherein the second condition set in advance relates to category, usage fee range or time zone.

11. The method according to claim 9, wherein the first condition is any one of a position of the portable information terminal, a season, a time, a weather at the position of the portable information terminal, and an attribute of a user of the portable information terminal, or is a combination of a plurality of conditions selected from the position of the portable information terminal, the season, the time, the weather at the position of the portable information terminal, and the attribute of the user of the portable information terminal.

12. The method according to claim 9, wherein the first condition is history information.

13. The method according to claim 9, further comprising recording the second information in a memory so that the recommended options are able to be referred to even when the status of the portable information terminal does not satisfy the first condition.

14. The method according to claim 13, wherein the storing in the memory records a history of the recommended options.

15. The method according to claim 9,
wherein the communication circuitry that comprises:
a first communication circuitry configured to perform wireless communication via an access point for wireless communication on the Internet,
a second communication circuitry configured to perform wireless communication via a base station of a telephone communication network, and
a third communication circuitry configured to perform proximity wireless communication.

16. The method according to claim 15, wherein the first information indicating the status of the portable information terminal is transmitted to the server by the first communication circuitry or the second communication circuitry.

* * * * *